US009346940B2

(12) United States Patent
Inomata et al.

(10) Patent No.: US 9,346,940 B2
(45) Date of Patent: May 24, 2016

(54) RESIN COMPOSITION OF GOOD LONG-RUN WORKABILITY COMPRISING ETHYLENE-VINYL ALCOHOL COPOLYMER

(75) Inventors: Naokiyo Inomata, Kurashiki (JP); Hiroyuki Shindome, Kurashiki (JP); Toshio Tuboi, Okayama (JP); Naoyuki Himi, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 12/480,135

(22) Filed: Jun. 8, 2009

(65) Prior Publication Data

US 2009/0247679 A1 Oct. 1, 2009

Related U.S. Application Data

(60) Continuation of application No. 12/250,991, filed on Oct. 14, 2008, now abandoned, which is a continuation of application No. 11/000,172, filed on Dec. 1, 2004, now abandoned, which is a continuation of application No. 10/269,044, filed on Oct. 11, 2002, now abandoned, which is a division of application No. 09/671,016, filed on Sep. 28, 2000, now abandoned.

(30) Foreign Application Priority Data

Sep. 29, 1999 (JP) .................................. 1999-277043
Sep. 29, 1999 (JP) .................................. 1999-277044

(51) Int. Cl.
| | | |
|---|---|---|
| *C08K 5/09* | (2006.01) | |
| *C08K 5/20* | (2006.01) | |
| *C08K 3/32* | (2006.01) | |
| *C08K 3/38* | (2006.01) | |
| *C08K 5/098* | (2006.01) | |

(52) U.S. Cl.
CPC ... *C08K 5/20* (2013.01); *C08K 3/32* (2013.01); *C08K 3/38* (2013.01); *C08K 5/098* (2013.01)

(58) Field of Classification Search
CPC ............ C08K 3/32; C08K 3/38; C08K 5/098; C08K 5/20; C08L 29/04
USPC .......................... 524/284, 320, 394, 405, 417
See application file for complete search history.

(56) References Cited

U.S. PATENT DOCUMENTS

| 3,890,267 | A | | 6/1975 | Fukushima et al. | |
|---|---|---|---|---|---|
| 3,926,876 | A | * | 12/1975 | Fukushima et al. | .......... 524/112 |
| 5,032,632 | A | | 7/1991 | Saxton et al. | |
| 5,118,743 | A | | 6/1992 | Yonezu et al. | |
| 5,194,474 | A | | 3/1993 | Aoyama et al. | |
| 5,342,662 | A | | 8/1994 | Aoyama et al. | |
| 5,360,670 | A | | 11/1994 | Yonezu et al. | |
| 5,849,376 | A | * | 12/1998 | Oishi et al. | .................... 428/34.9 |
| 6,174,949 | B1 | | 1/2001 | Ninomiya et al. | |
| 6,184,288 | B1 | | 2/2001 | Ninomiya et al. | |
| 6,232,382 | B1 | | 5/2001 | Ninomiya et al. | |
| 6,372,359 | B1 | | 4/2002 | Hayashi et al. | |
| 6,451,898 | B1 | | 9/2002 | Tanimoto et al. | |
| 6,485,842 | B1 | | 11/2002 | Shindome et al. | |
| 6,495,623 | B1 | | 12/2002 | Tanimoto et al. | |
| 6,635,709 | B2 | | 10/2003 | Kato et al. | |
| 6,964,990 | B2 | | 11/2005 | Kazeto et al. | |

FOREIGN PATENT DOCUMENTS

| EP | 0 308 703 | | 3/1989 | | |
|---|---|---|---|---|---|
| EP | 308703 | A2 * | 3/1989 | ............... | C08K 5/09 |
| EP | 0 386 720 | | 9/1990 | | |
| EP | 0 906 924 | | 4/1999 | | |
| EP | 0 930 339 | | 7/1999 | | |
| JP | 56-41204 | | 4/1981 | | |
| JP | S62-106904 | | 5/1987 | | |
| JP | 62-143954 | | 6/1987 | | |
| JP | 64-066262 | | 3/1989 | | |
| JP | H06-009932 | | 1/1994 | | |
| JP | 7-026107 | A | 1/1995 | | |
| JP | H09-067411 | | 3/1997 | | |
| JP | 9-263601 | A | 10/1997 | | |
| JP | 10-67898 | | 3/1998 | | |
| JP | 10067898 | A * | 3/1998 | ............... | C08L 23/26 |
| JP | 2001-164070 | A | 6/2001 | | |

OTHER PUBLICATIONS

Polymer Dictionary Editorial Committee in the Society of Polymer Science, published by Asakura Publishing Co., Ltd. on Nov. 25, 1988, 7 pages.
Office Action issued Dec. 3, 2015, in corresponding U.S. Appl. No. 14/324,911, 9 pp.

* cited by examiner

*Primary Examiner* — Marie Reddick
(74) *Attorney, Agent, or Firm* — Oblon, McClelland, Maier & Neustadt, L.L.P.

(57) ABSTRACT

The present invention relates to a resin composition having an ethylene-vinyl alcohol copolymer (EVOH) component and a multi-layered structure containing the resin composition.

10 Claims, 2 Drawing Sheets

RESIN COMPOSITION OF GOOD LONG-RUN WORKABILITY COMPRISING ETHYLENE-VINYL ALCOHOL COPOLYMER

CROSS-REFERENCE TO RELATED APPLICATIONS

The present application is a continuation of U.S. Ser. No. 12/250,991, filed Oct. 14, 2008 now abandoned, which is a continuation of U.S. Ser. No. 11/000,172, filed Dec. 1, 2004 now abandoned, which is a continuation of U.S. Ser. No. 10/269,044, filed Oct. 11, 2002 now abandoned, which is a division of U.S. Ser. No. 09/671,016, filed Sep. 28, 2000 now abandoned, which claims priority to JP 1999-277043, filed Sep. 29, 1999 and JP 1999-277044, filed Sep. 29, 1999.

BACKGROUND OF THE INVENTION

1. Field of the Invention

The present invention relates to a resin composition comprising an ethylene-vinyl alcohol copolymer (EVOH) and a multi-layered structure comprising the resin composition. The resin composition has good interlayer adhesiveness when fabricated into laminates, and its moldings are yellowed little and have good appearance with few fish eyes (gels or hard spots) and streaks. While molded in melt, the resin composition ensures good long-run workability, and when recycled, it is yellowed little.

2. Description of the Related Art

EVOH is a useful polymer material having good oxygen barrier properties, oil resistance, antistatic properties and mechanical strength, and is widely used for various wrapping and packaging materials such as films, sheets, containers, etc. Such wrapping and packaging materials are generally produced by molding polymers in melt. Therefore, the polymers for them are required to have good long-run workability in melt molding (that is, they can be molded into good moldings with neither fish eyes nor streaks even in long-run molding lines), and their moldings are required to have good appearance (that is, they are yellowed little and have few fish eyes). Another important matter with such melt-molding polymers recently discussed is their recyclability. Concretely, in case where wastes of EVOH moldings are recovered and again molded in melt through repeated heat history, they are required to have good recyclability (that is, the recovered EVOH wastes have good moldability) and the recycled EVOH moldings are required to be yellowed little. In addition, for producing EVOH moldings with good mechanical strength, moisture resistance and heat-sealability, in general, EVOH is co-extruded together with a substrate of polyolefinic resin or the like to give multi-layered structures (e.g., laminates) in which the EVOH layer and the substrate resin layer are bonded to each other via an adhesive layer therebetween. In those structures, therefore, the interlayer adhesiveness between the constituent resin layers is an important factor. Specifically, the matters indispensable to such melt-molding polymers are that their moldings have good appearance, that they ensure good long-run workability in melt-molding lines, that they are recyclable, and that their laminates ensure good interlayer adhesiveness.

To meet the situation as above, various proposals have heretofore been made for producing good EVOH moldings by specifically processing EVOH with acids and/or metal salts, which include, for example, the following:

(1) An EVOH composition is disclosed, which contains from 0.0005 to 0.05% by weight (in terms of the metal) of a salt of a metal of Group 2 of the Periodic Table, from 0.002 to 0.2% by weight of an acid having a pKa of at least 3.5 and a boiling point of not lower than 180° C., and from 0.01 to 0.2% by weight of an acid having a pKa of at least 3.5 and a boiling point of not higher than 120° C., and having a specific melt viscosity (JP-A-66262/1989, U.S. Pat. No. 5,118,743). It is said that the EVOH composition with such additives has improved long-run workability and its moldings have good appearance with few fish eyes.

(2) Also disclosed is an EVOH resin composition, to which are added a hydroxycarboxylic acid and/or its salt, an alkali metal salt, an alkaline earth metal salt, a phosphate salt and a boron compound for improving the yellowing resistance, the appearance and the interlayer adhesiveness of the composition (JP-A-67898/1998). The EVOH resin composition of Example 1 in the laid-open specification contains, relative to 100 parts by weight of EVOH therein, 2000 ppm (in terms of the lactate radical) of lactic acid, 350 ppm (in terms of the metal element) of an alkali metal salt, 50 ppm (in terms of the metal element) of an alkaline earth metal, 30 ppm (in terms of the phosphorus element) of a phosphors compound, and 40 ppm (in terms of the boron element) of a boron compound. The EVOH resin composition of Comparative Example 7 therein contains, relative to 100 parts by weight of EVOH therein, 1230 ppm (in terms of the acetate radical) of acetic acid, 350 ppm (in terms of the metal) of sodium acetate, 50 ppm (in terms of the metal) of magnesium acetate, 30 ppm (in terms of the phosphorus element) of potassium dihydrogenphosphate, and 40 ppm (in terms of the boron element) of boric acid, and it is said that the films of the composition are yellowed and have some fish eyes, though having good interlayer adhesiveness.

(3) Disclosed is an EVOH composition, to which are added from 0.001 to 1% by weight (in terms of the boron element) of a boron compound, at most 0.05% by weight of acetic acid, from 0.001 to 0.05% by weight (in terms of the metal) of an acetic acid salt and/or from 0.0005 to 0.05% by weight (in terms of the phosphate radical) of a phosphate salt for improving the appearance, the long-run workability, the stretchability and the interlayer adhesiveness of the composition (WO99/05213, EP 930,339).

(4) Disclosed is an EVOH resin composition, to which are added from 0 to 1% by weight (in terms of boron element) of a boron compound, from 0 to 0.05% by weight of acetic acid, from 0 to 0.1% by weight (in terms of the metal) of sodium acetate, and from 0.001 to 0.02% by weight (in terms of the metal) of magnesium acetate and/or calcium acetate for improving the appearance, the long-run workability and the interlayer adhesiveness of the composition (JP-A-106592/1999, EP 906,924).

(5) Disclosed is an EVOH resin composition, to which are added from 0.05 to 0.3% by weight (in terms of the boron element) of a boron compound, from 0.001 to 0.02% by weight (in terms of the metal) of sodium acetate, and from 0.001 to 0.02% by weight (in terms of the metal) of magnesium acetate for improving the long-run melt-moldability of the composition to give transparent moldings with few fish eyes and streaks (JP-A-60874/1999).

In the related art disclosures (1) to (5), however, no one can find out an EVOH composition satisfying all the necessary requirements of long-run workability in melt molding, good appearance of moldings, recyclability, yellowing resistance in recycling, and interlayer adhesiveness in laminates. Highly functional EVOH moldings of high quality are needed these days, but, at present, none of known moldings are on the satisfactory level that meets the requirements.

Odorless EVOH resin compositions are desired for ensuring good working environments in producing them and in melting and molding them. Regarding the technique for reducing the smell of EVOH resin compositions, however, nothing is referred to in the related art disclosures.

SUMMARY OF THE INVENTION

The present invention solves the problems noted above. In one aspect thereof, the invention provides a resin composition comprising an ethylene-vinyl alcohol copolymer, which is characterized in that, when it is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, that it contains from 0.05 to 4 µmol/g of a carboxylic acid (A), and that it satisfies the following formulae (1) and (2):

$$0.5 \leq \text{MFRmax/MFR0} \leq 45 \quad (1)$$

$$0.1 \leq (a1)/(A) \leq 1.0 \quad (2)$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated;
(A) indicates the total content (µmol/g) of the carboxylic acid (A) and its salt in the resin composition;
(a1) indicates the content (µmol/g) of a carboxylic acid (a1) having a molecular weight of at least 75 and its salt in the resin composition. This is hereinafter referred to as a first resin composition.

One preferred embodiment of the first resin composition contains from 50 to 500 ppm, in terms of the metal element, of an alkali metal salt (B). Another preferred embodiment thereof contains from 10 to 120 ppm, in terms of the metal element, of an alkaline earth metal salt (C).

Still another preferred embodiment of the first resin composition contains from 10 to 500 ppm, in terms of the phosphate radical, of a phosphate compound (D).

Still another preferred embodiment thereof contains from 50 to 2000 ppm, in terms of the boron element, of a boron compound (E).

In still another preferred embodiment of the first resin composition, the carboxylic acid (A) has a pKa of at least 3.5. In still another preferred embodiment thereof, the carboxylic acid (a1) having a molecular weight of at least 75 is a hydroxycarboxylic acid, more preferably a lactic acid.

Still another preferred embodiment of the first resin composition satisfies the following formula (3):

$$2 \leq [B \, (\mu\text{mol/g}) + C \, (\mu\text{mol/g})] / [A \, (\mu\text{mol/g}) + D \, (\mu\text{mol/g})] \leq 9 \quad (3)$$

wherein A indicates the content (µmol/g) of the carboxylic acid (A) in the resin composition per the unit weight of the composition;
B indicates the content (µmol/g, in terms of the metal element) of the alkali metal salt (B) in the resin composition per the unit weight of the composition;
C indicates the content (µmol/g, in terms of the metal element) of the alkaline earth metal salt (C) in the resin composition per the unit weight of the composition;
D indicates the content (µmol/g, in terms of the phosphate radical) of the phosphate compound (D) in the resin composition per the unit weight of the composition.

Another aspect of the invention provides a resin composition comprising an ethylene-vinyl alcohol copolymer, which is characterized in that, when it is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, that it contains from 50 to 500 ppm of a carboxylic acid (a2) having a molecular weight of smaller than 75, from 50 to 500 ppm, in terms of the metal element, of an alkali metal salt (B), from 10 to 120 ppm, in terms of the metal element, of an alkaline earth metal salt (C), from 10 to 200 ppm, in terms of the phosphate radical, of a phosphate compound (D), and from 50 to 2000 ppm, in terms of the boron element, of a boron compound (E), and that it satisfies the following formula (1):

$$0.5 \leq \text{MFRmax/MFR0} \leq 45 \quad (1)$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated. This is hereinafter referred to as a second resin composition.

In one preferred embodiment of the second resin composition, the carboxylic acid (a2) having a molecular weight of smaller than 75 is an acetic acid.

Another preferred embodiment of the second resin composition satisfies the following formula (4):

$$1 \leq [B \, (\mu\text{mol/g}) + C \, (\mu\text{mol/g})] / [D \, (\mu\text{mol/g}) + (a2) \, (\mu\text{mol/g})] \leq 15 \quad (4)$$

wherein (a2) indicates the content (µmol/g) of the carboxylic acid (a2) having a molecular weight of smaller than 75 in the resin composition per the unit weight of the composition;
B indicates the content (µmol/g, in terms of the metal element) of the alkali metal salt (B) in the resin composition per the unit weight of the composition;
C indicates the content (µmol/g, in terms of the metal element) of the alkaline earth metal salt (C) in the resin composition per the unit weight of the composition;
D indicates the content (µmol/g, in terms of the phosphate radical) of the phosphate compound (D) in the resin composition per the unit weight of the composition.

Preferably, the resin composition of the invention (including the first and second resin compositions—the same shall apply hereinunder) contains from 0.005 to 1 part by weight, relative to 100 parts by weight of the ethylene-vinyl alcohol copolymer therein, of a lubricant.

Also preferably, pellets of the resin composition of the invention have from 0.005 to 0.5 parts by weight, relative to 100 parts by weight of the resin composition, of a lubricant adhered on their outer surfaces.

The invention further provides a multi-layered structure comprising at least one layer of the resin composition.

DETAILED DESCRIPTION OF THE INVENTION

EVOH for use in the invention is preferably obtained by saponifying an ethylene-vinyl ester copolymer. Particularly preferred is an ethylene content of from 3 to 70 mol %. For ensuring good melt moldability of the resin composition to give moldings with good gas barrier properties, the ethylene content of EVOH preferably falls between 10 and 65 mol %, more preferably between 20 and 65 mol %, most preferably between 25 and 60 mol %. Also preferably, the degree of saponification of the vinyl ester moiety to give the vinyl alcohol moiety in EVOH is at least 80%, but more preferably at least 95% to ensure moldings with good gas barrier properties. Even more preferably it is at least 98%, still more preferably at least 99%. If the ethylene content of EVOH is larger than 70 mol %, the barrier properties and even the printability of the resin moldings may be poor. If the degree of saponification is smaller than 80%, the barrier properties, the heat stability and the moisture resistance of the resin moldings may be poor.

EVOH having an ethylene content of from 3 to 20 mol % is favorable to applications where water-solubility is required. An aqueous solution of such EVOH is an excellent coating material with good stability capable of being formed into coating films with good barrier properties.

One typical example of vinyl esters to be used in producing EVOH is vinyl acetate, which, however, is not limitative. Any other vinyl esters of fatty acids (e.g., vinyl propionate, vinyl pivalate, etc.) are usable herein. EVOH may contain from 0.0002 to 0.2 mol % of a vinylsilane compound serving as a comonomer. The vinylsilane compounds includes, for example, vinyltrimethoxysilane, vinyltriethoxysilane, vinyl-tri(β-methoxyethoxy)silane, γ-methacryloxypropylmethoxysilane, etc. Of those, preferred are vinyltrimethoxysilane and vinyltriethoxysilane.

The method of producing EVOH for use in the invention is described concretely. To produce it, for example, ethylene is polymerized with vinyl acetate in any desired manner including not only solution polymerization but also suspension polymerization, emulsion polymerization or bulk polymerization and in any desired mode of continuous or batchwise polymerization. One example of batchwise solution polymerization to produce the polymer is described, for which the polymerization condition is as follows.

Solvent:
Alcohols are preferred, but any other organic solvents (e.g., dimethylsulfoxide, etc.) capable of dissolving ethylene, vinyl esters and ethylene-vinyl ester copolymers may also be used. Alcohols usable herein include methyl alcohol, ethyl alcohol, propyl alcohol, n-butyl alcohol, t-butyl alcohol, etc. Especially preferred is methyl alcohol.

Catalyst:
Usable are azonitrile-type initiators such as 2,2-azobisisobutyronitrile, 2,2-azobis-(2,4-dimethylvaleronitrile), 2,2-azobis-(4-methoxy-2,4-dimethylvaleronitriie), 2,2-azobis-(2-cyclopropylpropionitrile), etc.; organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide, etc.

Temperature:
20 to 90° C., preferably 40 to 70° C.

Time:
2 to 15 hours, preferably 3 to 11 hours. With continuous polymerization, the average residence time in the polymerization vessel is desirably about the same.

Degree of Polymerization:
10 to 90%, preferably 30 to 80% based on the vinyl ester fed into the reactor.

Resin Content of the Solution after Polymerization:
5 to 85%, preferably 20 to 70%.

Ethylene Content of Copolymer:
Preferably 3 to 70 mol %, more preferably 10 to 65 mol %, even more preferably 20 to 65 mol %, still more preferably 25 to 60 mol %.

Except for ethylene and vinyl acetate, any other minor comonomers capable of copolymerizing with them may be present in the polymerization system. The comonomers include, for example, α-olefins such as propylene, isobutylene, α-octene, α-dodecene, etc.; unsaturated acids such as acrylic acid, methacrylic acid, crotonic acid, maleic acid, itaconic acid, etc., and their anhydrides, salts, or mono- or di-alkyl esters, etc.; nitriles such as acrylonitrile, methacrylonitrile, etc.; amides such as acrylamide, methacrylamide, etc.; olefinsulfonic acids such as ethylenesulfonic acid, allylsulfonic acid, methallylsulfonic acid, etc., and their salts; alkyl vinyl ethers, vinyl ketones, N-vinylpyrrolidone, vinyl chloride, vinylidene chloride, etc.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl acetate is purged away. To purge the ethylene-vinyl acetate copolymer from the non-reacted vinyl acetate after the removal of ethylene from the copolymer through evaporation, for example, the copolymer solution is continuously run into a column filled with raschig rings, in the downward direction at a constant flow rate, while a vapor of an organic solvent such as methanol or the like is jetted into the column from its bottom, whereby a mixed vapor of the organic solvent such as methanol or the like and the non-reacted vinyl acetate is run off from the column through its top, and the copolymer solution from which the non-reacted vinyl acetate was removed is taken out of the column through its bottom.

An alkali catalyst is added to the copolymer solution from which the non-reacted vinyl acetate was removed, and it saponifies the vinyl acetate moiety of the copolymer. For this, employable is any of continuous or batchwise saponification. The alkali catalyst includes, for example, sodium hydroxide, potassium hydroxide, alkali metal alcoholates, etc. One example of batchwise saponification is described, for which the condition is as follows.

Concentration of Copolymer Solution:
10 to 50%.

Reaction Temperature:
30 to 60° C.

Amount of Catalyst to be Used:
0.02 to 0.6 equivalents (based on the vinyl acetate moiety).

Time:
1 to 6 hours.

The degree of saponification of the saponified copolymer will vary, depending on the use of the copolymer, but is preferably at least 80% of the vinyl acetate moieties, more preferably at least 95% thereof, even more preferably at least 98% thereof, still more preferably at least 99% thereof. The degree of saponification could be varied in any desired manner by controlling the condition for saponification.

After having been thus processed, the resulting ethylene-vinyl alcohol copolymer is optionally but preferably neutralized and then washed to remove the alkali catalyst, by-produced salts and other impurities therefrom.

It is a matter of great importance that, when the resin composition of the invention (this is meant to include the first and second resin compositions of the invention, and the same shall apply hereinunder) is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, and that the resin composition satisfies the following formula (1):

$$0.5 \leq MFRmax/MFR0 \leq 45 \quad (1)$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated.

The EVOH resin composition of the invention characterized by the melt profile as above deposits little around the dies of molding machines where it is molded in melt. In addition, even when it is molded in melt for an extremely long period of time, its moldings (e.g., films, etc.) may have few fish eyes. In other words, the EVOH resin composition of the invention enjoys extremely excellent long-run workability.

Figure 1:
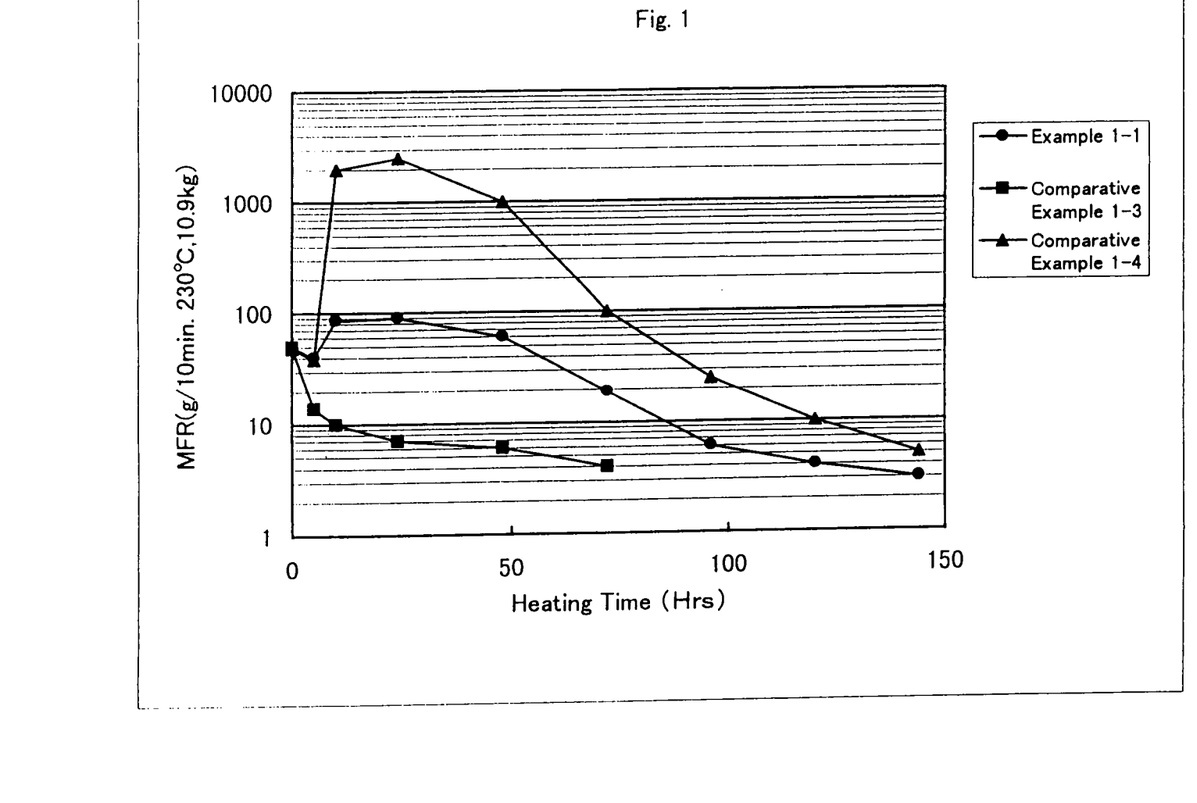
FIG. 1 is a graph (1) showing the relationship between MFR (at 230° C. under a load of 10.9 kg) of EVOH resin compositions heated in a nitrogen atmosphere at 220° C. and the time for heating them.
Figure 2:
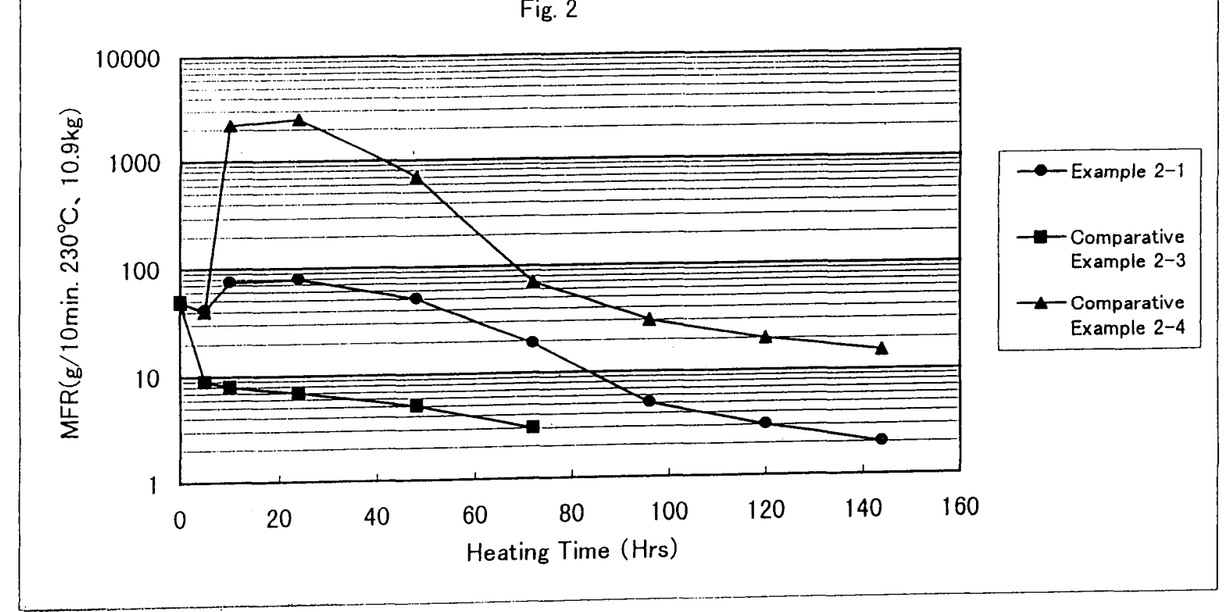
FIG. 2 is a graph (2) showing the relationship between MFR (at 230° C. under a load of 10.9 kg) of EVOH resin compositions heated in a nitrogen atmosphere at 220° C. and the time for heating them.

As opposed to this, EVOH resin compositions not having the above constitution (for example, the composition of Comparative Example 1-3—see FIG. 1; and the composition of Comparative Example 2-3—see FIG. 2) do not have the advantage of reducing their deposition around molding dies. In addition, when they are molded in long-run molding lines, the number of fish eyes appearing in their moldings apparently increases.

Through our careful studies, we, the present inventors have found that, while EVOH resin compositions not having the above constitution are molded in long-run molding lines, the frequency of fish eyes appearing in their moldings drastically increases. The drastic increase in the frequency of fisheyes appearing in the moldings is not forever throughout the molding operation, but, in general, the frequency of fish eyes appearing in them could be on an ordinary level within a few minutes to tens minutes after the start of the drastic increase in the frequency of fish eyes appearing in the moldings. However, the moldings with such increased fish eyes have poor appearance and are unacceptable for practical use.

Surprisingly, the resin composition of the invention can be molded into good moldings all the time even in long-run melt-molding lines, and its moldings are all the time free from the trouble of drastic increase in the frequency of fish eyes appearing therein. Accordingly, with no trouble even in long-run operation, the resin composition of the invention can be safely molded into films and others that are required to have extremely good appearance, and the productivity of its moldings is always high. To that effect, the invention is of high significance.

The EVOH resin composition of the invention satisfies the following formula (1):

$$0.5 \leq MFRmax/MFR0 \leq 45 \quad (1)$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated.

Preferably, the lowermost limit of MFRmax/MFR0 is 0.7, more preferably 1. Also preferably, the uppermost limit of MFRmax/MFR0 is 35, more preferably 20, most preferably 10. With its MFRmax/MFR0 falling within the defined range, the resin composition of the invention is free from the trouble of deposition of thermally-degraded resin around molding dies, and its moldings have few fish eyes. The advantages of the resin composition are that the frequency of fish eyes appearing in its moldings fluctuates little and is always negligible and that its moldings are yellowed little.

In case where the ratio of MFRmax/MFR0 is smaller than 0.5, the resin deposition around molding dies may increase to detract from the long-run workability of the resin composition, and, in addition, the frequency of fish eyes appearing in the resin moldings will fluctuate significantly. On the other hand, in case where the ratio MFRmax/MFR0 is over 45, EVOH decomposes to a great extent to worsen the appearance of the resin moldings, as is obvious from the data of Comparative Examples 1-4 and 2-4.

The carboxylic acid (A) for use in the invention is grouped into two, one being a carboxylic acid (a1) having a molecular weight of at least 75, and the other being a carboxylic acid (a2) having a molecular weight of smaller than 75. The carboxylic acid (a1) having a molecular weight of at least 75 includes, for example, succinic acid, adipic acid, benzoic acid, capric acid, lauric acid, glycolic acid, lactic acid, etc. In case where a dicarboxylic acid such as succinic acid, adipic acid or the like is used, the resin moldings may have fish eyes. As opposed to this, a hydroxycarboxylic acid such as glycolic acid, lactic acid or the like is preferred, as being free from such problems and having good solubility in water. Especially preferred is lactic acid. More preferably, the carboxylic acid (a1) having a molecular weight of at least 75 has a molecular weight of at least 80, even more preferably at least 85, still more preferably at least 90. It is desirable to add such a carboxylic acid having a higher molecular weight to the resin composition, since, in the resin composition, the amount of the volatile component that may evaporate while the resin composition is molded could be reduced, and the resin composition smells little and has good long-run workability.

For the carboxylic acid (a1) having a molecular weight of at least 75, preferred is lactic acid. This is because lactic acid is well soluble in water, as so mentioned hereinabove, and, in addition, its volatility is extremely small as compared with that of acetic acid. When the EVOH composition is pelletized, in general, its wet pellets are dried. In the drying step, the acid component, lactic acid in the wet pellets evaporates little, and the dried pellets can have more stable quality. In addition, the acidity of lactic acid (its pKa at 25° C. is 3.858) is higher than that of acetic acid (its pKa at 25° C. is 4.756). Therefore, the necessary amount of the acid component, lactic acid to be in the EVOH resin composition may be small. The advantages of using such low-volatile lactic acid in the EVOH resin composition are that the necessary amount of the acid to be in the composition may be small and that the acid can be surely prevented from running away from the reaction system of the composition being produced. Accordingly, the load to the operators who are in charge of producing the composition can be well reduced, and, in addition, the load to the surroundings around the production equipment (factories, etc.) can be also well reduced.

The carboxylic acid (a2) having a molecular weight of smaller than 75 includes, for example, formic acid, acetic acid, propionic acid, etc. Especially preferred is acetic acid, since it is inexpensive and its acidity is suitable for use herein, and since the pH of the resin composition containing it is easy to control.

The alkali metal salt (B) for use in the invention is not specifically defined, for which, however, preferred are sodium salts, potassium salts, etc. The anion of the alkali metal salt (B) is not also specifically defined. Preferred are acetate, phosphate and lactate anions.

The alkaline earth metal salt (C) for use in the invention is not specifically defined, for which, however, preferred are magnesium salts, calcium salts, barium salts, beryllium salts, etc. More preferred are magnesium salts and calcium salts.

The anion of the alkaline earth metal salt (C) is not also specifically defined. Preferred are acetate, lactate and phosphate anions.

The phosphate compound (D) for use in the invention includes, for example, various acids such as phosphoric acid, phosphorous acid, etc., and their salts, but is not limited to them. Any phosphate of any type of primary phosphates, secondary phosphates and tertiary phosphates may be used in the resin composition, and its cation is not specifically defined. Preferred are alkali metal salts and alkaline earth metal salts such as those mentioned above. Above all, especially preferred is any of sodium dihydrogenphosphate, potassium dihydrogenphosphate, disodium hydrogenphosphate or dipotassium hydrogenphosphate as the phosphate compound (D) to be in the resin composition.

The boron compound (E) for use in the invention includes, for example, boric acids, esters of boric acids, salts of boric acids, boron hydrides, etc., but is not limited to them. Concretely, the boric acids include orthoboric acid, metaboric acid, tetraboric acid, etc.; the esters of boric acids include triethyl borate, trimethyl borate, etc.; the salts of boric acids include alkali metal salts and alkaline metal salts of various types of boric acids such as those mentioned above, as well as borax, etc. Of those compounds, especially preferred is orthoboric acid (this will be hereinafter referred to as boric acid).

The most significant characteristic of the EVOH resin composition of the invention is that, when it is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, that it satisfies the following formula (1) and that contains a specific amount of a carboxylic acid (A).

$$0.5 \leq \text{MFRmax/MFR0} \leq 45 \tag{1}$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated.

Specifically, the first resin composition of the invention comprises an ethylene-vinyl alcohol copolymer and is characterized in that, when it is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, that it contains from 0.05 to 4 μmol/g of a carboxylic acid (A), and that it satisfies the following formulae (1) and (2):

$$0.5 \leq \text{MFRmax/MFR0} \leq 45 \tag{1}$$

$$0.1 \leq (a1)/(A) \leq 1.0 \tag{2}$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated;
(A) indicates the total content (μmol/g) of the carboxylic acid (A) and its salt in the resin composition;
(a1) indicates the content (μmol/g) of a carboxylic acid (a1) having a molecular weight of at least 75 and its salt in the resin composition.

In the first resin composition of the invention that satisfies the above formula (2), the content of the carboxylic acid (A) must fall between 0.05 and 4.5 μmol/g. If the content of the carboxylic acid (A) therein is smaller than 0.05 μmol/g, the resin composition will be strongly yellowed when melted. If, on the other hand, the content is larger than 4.5 μmol/g, the resin composition will much smell, and, in addition, its adhesiveness, especially interlayer adhesiveness to resins neighboring thereto may be poor. The lowermost limit of the content of the carboxylic acid (A) in the resin composition is preferably at least 0.1 μmol/g, more preferably at least 0.2 μmol/g. The uppermost limit of the content of the carboxylic acid (A) therein is preferably at most 3 μmol/g, more preferably at most 2 μmol/g, most preferably at most 1.5 μmol/g.

In formula (2), the lowermost limit of the ratio (a1)/(A) is preferably at least 0.5, more preferably at least 0.7, even more preferably at least 0.9, most preferably at least 0.98.

Preferably, the first resin composition of the invention contains from 50 to 500 ppm, more preferably from 100 to 300 ppm, in terms of the metal element, of an alkali metal salt (B) for further improving the adhesiveness of the composition. In case where the content of the alkali metal salt (B) in the composition is smaller than 50 ppm, the adhesiveness of the composition may be poor; but where the content is larger than 500 ppm, the yellowing resistance of the composition may be poor.

Also preferably, the first resin composition of the invention contains from 10 to 120 ppm, more preferably from 20 to 100 ppm, in terms of the metal element, of an alkaline earth metal salt (C). Containing an alkaline earth metal salt within the defined range, the time-dependent MFR change of the EVOH resin composition is easy to control. Accordingly, while molded in melt, the resin composition may be prevented from being degraded under heat, and the amount of the thermally-degraded resin that may deposit around the dies of molding machines can be reduced. In addition, the long-run workability of the composition can be much improved. If, however, the content of the alkaline earth metal salt in the composition is smaller than 10 ppm, the long-run workability of the composition could not be improved so much. If, on the contrary, the content is larger than 120 ppm, the composition will be much yellowed when melted.

In case where the alkaline earth metal salt (C) in the resin composition is a magnesium salt, its content preferably falls between 10 and 60 ppm in terms of the metal element, more preferably between 20 and 50 ppm. In case where the alkaline earth metal salt (C) therein is a calcium salt, its content preferably falls between 20 and 120 ppm in terms of the metal element, more preferably between 40 and 100 ppm.

The first resin composition of the invention contains a specific amount of a high-boiling-point carboxylic acid (a1) having a molecular weight of at least 75. Therefore, even in long-run melt-molding operation, it can be molded into good moldings having good yellowing resistance and good appearance. In view of the production costs and the productivity, the absence of a phosphate compound (D) in the resin composition will be often desirable. However, adding a phosphate compound (D) to the resin composition will further improve the long-run workability and the recyclability of the resin composition. In particular, in case where the resin composition is molded in long-run operation that will continue for a few days or more or where it undergoes repeated heat history of repeated heat cycles (for example, when its moldings are recycled), the phosphate compound (D), if any, therein will be significantly effective in improving the yellowing resistance of the composition.

Preferably, the amount of the phosphate compound (D) to be added to the resin composition falls between 10 and 500 ppm in terms of the phosphate radical, more preferably between 10 and 200 ppm, even more preferably between 20 and 150 ppm. Containing a phosphate compound within the range, the resin composition may have higher yellowing resistance and better long-run workability and may be molded into moldings having better appearance. However, if the content of the phosphate compound (D) therein is smaller than 10 ppm, the resin composition will be yellowed when it is molded in melt, and the resin moldings will have poor appearance. In particular, the problem with it will be more serious when the resin composition is subjected to repeated heat history (repeated heat cycles), and, as a result, its recyclability may be poor. On the other hand, if the content of the phosphate compound (D) therein is over 500 ppm, the resin moldings will have many fish eyes and their appearances may be poor.

Also preferably, the first resin composition of the invention contains from 50 to 2000 ppm, in terms of the boron element, of a boron compound (E). The EVOH resin composition containing a boron compound can have increased melt viscosity even when EVOH therein has a low degree of polymerization. The advantage of the EVOH resin composition in which EVOH has a low degree of polymerization is that it can be molded into better moldings with fewer fish eyes and it has better long-run workability than ordinary EVOH resin compositions. In case where the first resin composition of the invention contains a boron compound (E), the resin deposition around molding dies in long-run melt-molding operation that will continue for a few days or more can be retarded to some degree, and, in addition, the resin moldings can be effectively prevented from having fish eyes.

The lowermost limit of the boron compound (E) to be in the resin composition is preferably at least 50 ppm, more preferably at least 100 ppm, even more preferably at least 150 ppm. The uppermost limit thereof is preferably at most 1500 ppm, more preferably at most 1000 ppm. If the content of the boron compound (E) in the resin composition is smaller than 50 ppm, fish eyes may increase in the resin moldings with the increase in the molding time. If so, therefore, the resin moldings will have poor appearance when produced in long-run molding operation. On the other hand, however, if the content of the boron compound (E) therein is larger than 2000 ppm, the resin composition will readily gel, and will often fail to be molded into good moldings.

Also preferably, the first resin composition of the invention satisfies the following formula (3) for better results.

$$2 \leq [B\ (\mu mol/g) + C\ (\mu mol/g)] / [A\ (\mu mol/g) + D\ (\mu mol/g)] \leq 9 \quad (3)$$

wherein A indicates the content ($\mu mol/g$) of the carboxylic acid (A) in the resin composition per the unit weight of the composition;
B indicates the content ($\mu mol/g$, in terms of the metal element) of the alkali metal salt (B) in the resin composition per the unit weight of the composition;
C indicates the content ($\mu mol/g$, in terms of the metal element) of the alkaline earth metal salt (C) in the resin composition per the unit weight of the composition;
D indicates the content ($\mu mol/g$, in terms of the phosphate radical) of the phosphate compound (D) in the resin composition per the unit weight of the composition.

With the increase in the content of the alkali metal salt (B) and that of the alkaline earth metal salt (C) in the EVOH resin composition, the adhesiveness of the composition increases, the resin deposition around molding dies reduces, and the ratio MFRmax/MFR0 generally increases. However, adding too much of the alkaline metal salt (B) and the alkaline earth metal salt (C) to the resin composition may have some negative influences on the yellowing resistance of the composition and may decompose the resin composition to make it smell.

Increasing the content of the carboxylic acid (A) and that of the phosphate compound (D) in the EVOH resin composition could enhance the yellowing resistance of the resin moldings, but generally lowers MFRmax/MFR0. Appropriately adding the carboxylic acid (A) and the phosphate compound (D) thereto could enhance the long-run workability of the resin composition. However, adding too much of the carboxylic acid (A) and the phosphate compound (D) to the resin composition will rather increase fish eyes in the resin moldings and may lower the adhesiveness of the resin composition. Accordingly, the influences of the carboxylic acid (A), the alkali metal salt (B), the alkaline earth metal salt (C) and the phosphate compound (D) on the properties of the resin composition correlate to each other, and well-balanced formulation of these additives in the EVOH resin composition will enable the composition to satisfy all the requirements of non-odorousness, long-run workability in melt molding, good appearance, recyclability, yellowing resistance and interlayer adhesiveness.

Specifically, the first resin composition that satisfies the above formula (3) enjoys well-balanced interlayer adhesion strength and good appearance of its moldings. In case where the ratio [B ($\mu mol/g$)+C ($\mu mol/g$)]/[A ($\mu mol/g$)+D ($\mu mol/g$)] in the resin composition is smaller than 2, the interlayer adhesion strength of the composition will be low; but if larger than 9, the composition will be much yellowed and its moldings will have poor appearance. More preferably, the lowermost limit of the ratio [B ($\mu mol/g$)+C ($\mu mol/g$)]/[A ($\mu mol/g$)+D ($\mu mol/g$)] is at least 3, even more preferably at least 4. Also more preferably, the uppermost limit of the ratio is at most 8, even more preferably at most 7.

We, the present inventors have further studied EVOH resin compositions not satisfying the above formula (2) with respect to the carboxylic acid (A) therein, and have found and developed another type of EVOH resin composition (second resin composition) which can satisfy, though not defined by the formula (2), the requirements of yellowing resistance, good appearance with few fish eyes and streaks, long-run workability in melt molding, recyclability with no yellowing trouble, and good interlayer adhesiveness in laminates.

The second resin composition of the invention comprises an ethylene-vinyl alcohol copolymer and is characterized in that, when it is heated in a nitrogen atmosphere at 220° C., its MFR (at 230° C. under a load of 10.9 kg) shows a minimum value within 10 hours after the start of heating it, and shows a maximum value (MFRmax) within 100 hours after showing its minimum value, that it contains from 50 to 500 ppm of a carboxylic acid (a2) having a molecular weight of smaller than 75, from 50 to 500 ppm, in terms of the metal element, of an alkali metal salt (B), from 10 to 120 ppm, in terms of the metal element, of an alkaline earth metal salt (C), from 10 to 200 ppm, in terms of the phosphate radical, of a phosphate compound (D), and from 50 to 2000 ppm, in terms of the boron element, of a boron compound (E), and that it satisfies the following formula (1):

$$0.5 \leq MFRmax/MFR0 \leq 45 \quad (1)$$

wherein MFRmax indicates the maximum value of MFR (at 230° C. under a load of 10.9 kg) of the resin composition heated in a nitrogen atmosphere at 220° C.;
MFR0 indicates MFR (at 230° C. under a load of 10.9 kg) of the resin composition not heated.

The second resin composition of the invention contains from 50 to 500 ppm of a carboxylic acid (a2) having a molecular weight of smaller than 75. The lowermost limit of the content of the carboxylic acid (a2) having a molecular weight of smaller than 75 in the composition is preferably at least 75 ppm, more preferably at least 100 ppm. The uppermost limit of the content of the carboxylic acid (a2) having a molecular weight of smaller than 75 therein is preferably at most 400 ppm, more preferably at most 300 ppm. If, in the resin composition, the content of the carboxylic acid (a2) having a molecular weight of smaller than 75 is smaller than 50 ppm, the composition will be strongly yellowed when it is melted; but if it is larger than 500 ppm, the interlayer adhesiveness of the composition is poor. In one preferred embodiment of the composition, the carboxylic acid (a2) having a molecular weight of smaller than 75 is acetic acid.

The second resin composition of the invention contains from 50 to 500 ppm, in terms of the metal element, of an alkali metal salt (B). Preferably, the content of the alkali metal salt (B) in the composition falls between 100 and 300 ppm. If the content is smaller than 50 ppm, the adhesiveness of the resin composition to other resins is poor, and especially the interlayer adhesiveness thereof in co-extrusion molding is poor. If, on the other hand, the content is larger than 500 ppm, the resin composition will be strongly yellowed when it is melted.

The second resin composition of the invention contains from 10 to 120 ppm, but preferably from 20 to 100 ppm, in terms of the metal element, of an alkaline earth metal salt (C). The content of the alkaline earth metal salt (C) to fall within the defined range in the EVOH resin composition is a matter of great importance for controlling the time-dependent fluctuation of MFR of the composition. If the content of the alkaline earth metal salt (C) therein is smaller than 10 ppm, the long-run workability of the resin composition is poor; but if larger than 120 ppm, the resin composition will be strongly yellowed when melted.

In case where the alkaline earth metal salt (C) in the resin composition is a magnesium salt, its preferred content therein falls between 10 and 60 ppm, more preferably between 20 and 50 ppm, in terms of the metal element. In case where the alkaline earth metal salt (C) in the resin composition is a calcium salt, its preferred content therein falls between 20 and 120 ppm, more preferably between 40 and 100 ppm, in terms of the metal element.

The second resin composition of the invention contains from 10 to 500 ppm, in terms of the phosphate radical, of a phosphate compound (D). Preferably, the lowermost limit of the content of the phosphate compound (D) in the resin composition is at least 20 ppm, more preferably at least 30 ppm, most preferably at least 50 ppm. The uppermost limit of the content of the phosphate compound (D) therein is preferably at most 250 ppm, more preferably at most 150 ppm. Containing a phosphate compound within the defined range, the resin composition has better yellowing resistance and better long-run workability, and can be formed into moldings having better appearance. If the content of the phosphate compound (D) therein is smaller than 10 ppm, the resin composition will be much yellowed and the appearance of its moldings may be poor. The tendency is especially noticeable when the resin composition undergoes heat history (heat cycles), and the recyclability of the resin composition may be poor. If, on the other hand, the content of the phosphate compound (D) in the resin composition is larger than 500 ppm, the resin moldings will have many fish eyes, and their appearance will be therefore poor.

The second resin composition of the invention contains from 50 to 2000 ppm, in terms of the boron element, of a boron compound (E). Preferably, the lowermost limit of the content of the boron compound (E) in the resin composition is at least 100 ppm, more preferably at least 150 ppm. The uppermost limit of the content of the boron compound (E) therein is preferably at most 1500 ppm, more preferably at most 1000 ppm. If its content is smaller than 50 ppm, the boron compound (E) added to the resin composition will be ineffective in enhancing the long-run workability of the resin composition; but if larger than 2000 ppm, the resin composition will readily gel and will often fail to be molded into good moldings, and the appearance of the resin moldings may be poor.

In case where the EVOH resin composition of the invention does not satisfy the above formula (2), or that is, in case where the ratio (a1)/(A) therein is smaller than 0.1 (provided that (A) indicates the total content (μmol/g) of the carboxylic acid (A) and its salt in the resin composition, and (a1) indicates the content (μmol/g) of a carboxylic acid (a1) having a molecular weight of at least 75 and its salt in the resin composition), the resin composition must contain all the components noted above. In other words, the second resin composition of the invention ensures the advantages of the invention only when it contains all the indispensable components, carboxylic acid (a2) having a molecular weight of smaller than 75, alkali metal salt (B), alkaline earth metal salt (C), phosphate compound (D) and boron compound (E), with their amounts individually falling within the range specifically defined herein. As is obvious from the Examples and the Comparative Examples given hereinunder, the second resin composition of the invention fails to have good properties if it lacks any one of the components (a2), (B), (C), (D) and (E).

Preferably, the second resin composition of the invention satisfies the following formula (4) for more significantly ensuring the advantages of the invention.

$$1 \leq [B\,(\mu mol/g) + C\,(\mu mol/g)] / [D\,(\mu mol/g) + (a2)\,(\mu mol/g)] \leq 15 \qquad (4)$$

wherein (a2) indicates the content (μmol/g) of the carboxylic acid (a2) having a molecular weight of smaller than 75 in the resin composition per the unit weight of the composition;
B indicates the content (μmol/g, in terms of the metal element) of the alkali metal salt (B) in the resin composition per the unit weight of the composition;
C indicates the content (μmol/g, in terms of the metal element) of the alkaline earth metal salt (C) in the resin composition per the unit weight of the composition;
D indicates the content (μmol/g, in terms of the phosphate radical) of the phosphate compound (D) in the resin composition per the unit weight of the composition.

With the increase in the content of the alkali metal salt (B) and that of the alkaline earth metal salt (C) in the EVOH resin composition, the adhesiveness of the composition increases, the resin deposition around molding dies reduces, and the ratio MFRmax/MFR0 generally increases. However, adding too much of the alkaline metal salt (B) and the alkaline earth metal salt (C) to the resin composition may have some negative influences on the yellowing resistance of the composition and may decompose the resin composition to make it smell.

Increasing the content of the phosphate compound (D) and that of carboxylic acid (a2) having a molecular weight of smaller than 75 in the EVOH resin composition could enhance the yellowing resistance of the resin moldings, but generally lowers MFRmax/MFR0. Appropriately adding the phosphate compound (D) and the carboxylic acid (a2) having a molecular weight of smaller than 75 thereto could enhance the long-run workability of the resin composition. However, adding too much of the phosphate compound (D) and the carboxylic acid (a2) having a molecular weight of smaller than 75 to the resin composition will rather increase fish eyes in the resin moldings and may lower the adhesiveness of the resin composition. Accordingly, the influences of the alkali metal salt (B), the alkaline earth metal salt (C), the phosphate compound (D) and the carboxylic acid (a2) having a molecular weight of smaller than 75 on the properties of the resin composition correlate to each other, and well-balanced formulation of these additives in the EVOH resin composition will enable the composition to satisfy all the requirements of long-run workability in melt molding, good appearance, recyclability, yellowing resistance and interlayer adhesiveness.

Specifically, the second resin composition that satisfies the above formula (4) enjoys well-balanced interlayer adhesion strength and good appearance of its moldings. In case where the ratio [B (µmol/g)+C (µmol/g)]/[D (µmol/g)+(a2) (µmol/g)] in the resin composition is smaller than 1, the interlayer adhesion strength of the composition will be low; but if larger than 15, the composition will be much yellowed and its moldings will have poor appearance. More preferably, the uppermost limit of the ratio [B (µmol/g)+C (µmol/g)]/[D (µmol/g)+(a2) (µmol/g)] is at most 10, even more preferably at most 7, most preferably at most 5.

Preferably, the EVOH resin composition of the invention (including the first and second resin compositions) contains from 0.005 to 1 part by weight, relative to 100 parts by weight of EVOH therein, of a lubricant. The lubricant, if any, in the resin composition reduces the resin deposition around molding dies, and enhances the yellowing resistance of recycled moldings and also the long-run workability of the resin composition. The effect of the lubricant is more remarkable when it is added to the first resin composition of the invention that contains a boron compound (E).

In case where the first resin composition of the invention that contains a boron compound (E) is continuously molded in a long-run melt-molding line, the frequency of fish eyes appearing in the moldings may increase in some degree. Through our careful studies, however, we, the present inventors have surprisingly found that a lubricant, if added to the EVOH resin composition of that type in an amount of from 0.005 to 1 part by weight, relative to 100 parts by weight of EVOH therein, is significantly effective in preventing the fluctuation of the frequency of fish eyes appearing in the resin moldings for a long period of time even in long-run melt-molding operation.

To the second resin composition of the invention that indispensably contains a boron compound (E), adding from 0.005 to 1 part by weight, relative to 100 parts by weight of EVOH in the composition, of a lubricant is also preferable, as the lubricant therein enhances the composition.

Preferably, the lubricant content of the resin composition falls between 0.005 and 1 part by weight relative to 100 parts by weight of EVOH in the composition. If the lubricant content is smaller than 0.005 parts by weight relative to 100 parts by weight of EVOH in the composition, the intended effect of the lubricant noted above may be unsatisfactory. On the other hand, if the lubricant content is larger than 1 part by weight relative to 100 parts by weight of EVOH in the composition, the resin moldings may often surge and the extrusion stability of the composition may be poor. More preferably, the lowermost limit of the lubricant content is at least 0.01 parts by weight relative to 100 parts by weight of EVOH in the resin composition; and the uppermost limit thereof is at most 0.8 parts by weight, even more preferably at most 0.7 parts by weight, most preferably at most 0.5 parts by weight relative to 100 parts by weight of EVOH in the composition.

The lubricant for use herein is not specifically defined, including, for example, metal salts of higher fatty acids (e.g., calcium stearate, etc.), low-molecular-weight polyolefins (e.g., low-molecular-weight polyethylene or polypropylene having a molecular weight of from 500 to 10000 or so, etc.), but not limited to them. Especially preferred for the lubricant are higher fatty acid amides, concretely including saturated higher fatty acid amides (e.g., stearic acid amide, palmitic acid amide, lauric acid amide, etc.), unsaturated higher fatty acid amides (e.g., oleic acid amide, erucic acid amide, etc.), higher bis-fatty acid amides (e.g., ethylenebis-stearic acid amide, methylenebis-stearic acid amide, etc.). Higher fatty acids referred to herein are meant to indicate fatty acids having at least 6 carbon atoms, but preferably having at least 10 carbon atoms.

The morphology of the lubricant is not specifically defined, including, for example, powders, solutions, liquid dispersions, etc. The mode of adding such a lubricant to the resin composition of the invention is not also specifically defined. For example, employable is a method of melting and mixing a lubricant and a resin composition; a method of adding a lubricant to a saponified ethylene-vinyl acetate copolymer solution followed by extruding the resulting mixture into a coagulant bath to form polymer strands therein; or a combination of the two methods.

Also preferably, pellets of the resin composition of the invention have from 0.005 to 0.5 parts by weight, relative to 100 parts by weight of the composition, of a lubricant adhered to their outer surfaces. More preferably, the lowermost limit of the lubricant to be adhered to the resin pellets is at least 0.01 parts by weight relative to 100 parts by weight of the resin composition; and the uppermost limit thereof is at most 0.3 parts by weight, even more preferably at most 0.2 parts by weight, most preferably at most 0.1 parts by weight relative to 100 parts by weight of the resin composition. If the amount of the lubricant adhered onto the outer surfaces of the resin pellets is larger than 0.5 parts by weight relative to 100 parts by weight of the resin composition, the resin pellets may be difficult to stably feed into extruders. The method of producing the resin pellets is not specifically defined. One preferred embodiment for it comprises dryblending EVOH resin pellets and a lubricant.

Preferably, the melt flow rate (MFR) of the EVOH resin composition of the invention falls between 0.1 and 200 g/10 min. The MFR is measured at 190° C. and under a load of 2160 g. For the EVOH resin composition having a melting point of around 190° C. or above 190° C., its MFR is measured under a load of 2160 g at different temperatures not lower than its melting point. The data are plotted on a semilogarithmic graph with the horizontal axis indicating the reciprocal of the absolute temperature and the vertical axis indicating the logarithm of the MFR measured, and the value corresponding to 190° C. is extrapolated from the curve of the thus-plotted data. More preferably, the lowermost limit of the MFR of the resin composition is at least 0.2 g/10 min, even more preferably at least 0.5 g/10 min, most preferably at least 1 g/10 min; the uppermost limit thereof is more preferably at most 50 g/10 min, even more preferably at most 10 g/10 min, most preferably at most 7 g/10 min. If its MFR is smaller than 0.1 g/10 min, the resin composition being processed in an extruder will be in a high torque condition and its extrusion may be therefore difficult. On the other hand, if the MFR of the resin composition is larger than 200 g/10 min, it is unfavorable since the mechanical strength of the resin moldings of the resin composition may be low.

If desired, the EVOH resin composition of the invention may be blended with different types of EVOHs each having a different degree of polymerization, a different ethylene content and a different degree of saponification. Also if desired, a suitable amount of various plasticizers, stabilizers, surfactants, colorants, UV absorbents, slip agents, antistatic agents, drying agents, crosslinking agents, metal salts, fillers, reinforcing agents such as various fibers, etc. may be added to the resin composition.

Also if desired, a suitable amount of any other thermoplastic resins may be added to the resin composition. Other thermoplastic resins that may be added to the resin composition include, for example, various types of polyolefins (e.g., polyethylene, polypropylene, poly-1-butene, poly-4-methyl-1-pentene, ethylene-propylene copolymers, copolymers of ethylene with α-olefins having at least 4 carbon atoms, polyolefin-maleic anhydride copolymers, ethylene-vinyl ester copolymers, ethylene-acrylate copolymers, and also modified polyolefins prepared by graft-modifying such polymers and copolymers with unsaturated carboxylic acids or their derivatives, etc.), various types of nylons (e.g., nylon-6, nylon-6,6, nylon-6/6,6 copolymers, etc.), and also polyvinyl chlorides, polyvinylidene chlorides, polyesters, polystyrenes, polyacrylonitriles, polyurethanes, polyacetals, modified polyvinyl alcohol resins, etc.

The method of adding a carboxylic acid (A) and optionally an alkali metal salt (B), an alkaline earth metal salt (C), a phosphate compound (D) and a boron compound (E) to EVOH for preparing the EVOH resin composition of the invention is not specifically defined. For example, employable is any of a method of dipping EVOH in a solution of the additive compounds; a method of melting EVOH followed by adding the additive compounds to the EVOH melt; and a method of dissolving EVOH in a suitable solvent followed by mixing the EVOH solution with the additive compounds.

Of those, preferred is the method of dipping EVOH in a solution of the additive compounds for more favorably ensuring the effect of the invention. The treatment for the method may be effected in any mode of batch operation or continuous operation. For the treatment, the morphology of EVOH is not limited, including, for example, powders, granules, spherical pellets, columnar pellets, etc.

In the method where EVOH is dipped in a solution containing a carboxylic acid (A) and optionally an alkali metal salt (B), an alkaline earth metal salt (C), a phosphate compound (D) and a boron compound (E), the concentration of the carboxylic acid (A) and optionally alkali metal salt (B), alkaline earth metal salt (C), phosphate compound (D) and boron compound (E) to be in the solution is not specifically defined. The solvent for the solution is also not specifically defined. In view of its handlability, preferred is an aqueous solution. The dipping time will vary, depending on the morphology of EVOH, but is preferably not shorter than 1 hour, more preferably not shorter than 2 hours, for EVOH pellets having a size of from 1 to 10 mm or so.

Regarding the dipping treatment of EVOH in the solution of the compounds, EVOH may be dipped in a plurality of different solutions separately containing any of the compounds, or may be dipped in one solution containing all the compounds. In particular, especially preferred is dipping EVOH in one solution containing all of a carboxylic acid (A) and optionally an alkali metal salt (B), an alkaline earth metal salt (C), a phosphate compound (D) and a boron compound (E), as the treatment in that manner is simple. After having been dipped in the solution, EVOH is finally dried and the intended EVOH composition is thus obtained.

The EVOH resin composition obtained in the above manner is molded in melt into various moldings such as films, sheets, containers, pipes, fibers, etc. The moldings can be recycled by grinding and re-molding them. The films, sheets and fibers of the composition may be uniaxially or biaxially stretched. For molding the composition in melt, employable is any mode of extrusion, inflation extrusion, blow molding, melt spinning, injection molding, etc. The temperature at which the resin composition is melted varies, depending on the melting point of EVOH in the composition, but preferably falls between 150 and 270° C. or so.

The EVOH resin composition of the invention may be molded into single-layered moldings of the composition alone, but, in practical use, it is often molded into multi-layered structures comprising at least one layer of the composition in which the layer of the composition may be in any form of film, sheet or the like. The layer constitution of the multi-layered structures includes, for example, E/Ad/T, T/Ad/E/Ad/T, etc., in which E indicates the EVOH resin composition of the invention, Ad indicates an adhesive resin, and T indicates a thermoplastic resin. However, these are not limitative. In the multi-layered structures, each layer may be single-layered, or, as the case may be, multi-layered.

The method of producing the multi-layered structures as above is not specifically defined. For example, employable are a method of melt-extruding a thermoplastic resin onto a molding (e.g., film, sheet, etc.) of the EVOH resin composition; a method of co-extruding the EVOH resin composition along with any other thermoplastic resin, etc.; a method of co-injecting the EVOH resin composition along with any other thermoplastic resin; a method of laminating films or sheets of a molding of the EVOH resin composition and any other substrate via a known adhesive of, for example, organotitanium compounds, isocyanate compounds, polyester compounds and the like, therebetween. Of those, preferred is the method of co-extruding the EVOH resin composition along with any other thermoplastic resin.

The thermoplastic resin that may be laminated with the EVOH resin composition of the invention includes, for example, homopolymers or copolymers of olefins such as linear low-density polyethylenes, low-density polyethylenes, middle-density polyethylenes, high-density polyethylenes, ethylene-vinyl acetate copolymers, ethylene-propylene copolymers, polypropylenes, propylene-α-olefin copolymers (in which the α-olefin has from 4 to 20 carbon atoms), polybutenes, polypentenes, etc.; polyesters such as polyethylene terephthalates, etc.; polyester elastomers; polyamide resins such as nylon-6, nylon-6,6, etc.; as well as polystyrenes, polyvinyl chlorides, polyvinylidene chlorides, acrylic resins, vinyl ester resins, polyurethane elastomers, polycarbonate, chloropolyethylenes, chloropolypropylenes, etc. Of those, preferred are polypropylenes, polyethylenes, ethylene-propylene copolymers, ethylene-vinyl acetate copolymers, polyamides, polystyrenes, and polyesters.

In case where the EVOH resin composition of the invention is layered with a thermoplastic resin, an adhesive resin may be used therebetween. In that case, the adhesive resin preferably comprises a carboxylic acid-modified polyolefin. The carboxylic acid-modified polyolefin is preferably a modified olefinic polymer having carboxyl groups that may be prepared by chemically bonding an ethylenic unsaturated carboxylic acid or its anhydride to an olefinic polymer, for example, through addition reaction or grafting reaction. The olefinic polymer includes, for example, polyolefins such as polyethylenes (produced in low-pressure, middle-pressure or high-pressure process), linear low-density polyethylenes, polypropylenes, polybutenes, etc.; copolymers of olefins with comonomers capable of copolymerizing with olefins (e.g., vinyl esters, unsaturated carboxylates, etc.), such as ethylene-vinyl acetate copolymers, ethylene-ethyl acrylate copolymers, etc. Of those, preferred are linear low-density polyethylenes, ethylene-vinyl acetate copolymers (having a vinyl acetate content of from 5 to 55% by weight), and ethylene-ethyl acrylate copolymers (having an ethyl acrylate content of from 8 to 35% by weight); and more preferred are linear-low density polyethylenes and ethylene-vinyl acetate copolymers. The ethylenic unsaturated carboxylic acid and its anhydride include, for example, ethylenic unsaturated monocarboxylic acids and their esters, ethylenic unsaturated dicarboxylic acids and their mono- or di-esters and anhydrides. Of those, preferred are ethylenic unsaturated dicarboxylic acid anhydrides. Concretely, they include maleic acid, fumaric acid, itaconic acid, maleic anhydride, itaconic anhydride, monomethyl maleate, monoethyl maleate, diethyl maleate, monomethyl fumarate, etc. Above all, most preferred is maleic anhydride.

The amount of the ethylenic unsaturated carboxylic acid or its anhydride to be added to or grafted on the olefinic polymer (that is, the degree of modification of the polymer) may fall between 0.0001 and 15% by weight of the olefinic polymer, but preferably between 0.001 and 10% by weight. Addition reaction or grafting reaction of the ethylenic unsaturated carboxylic acid or its anhydride to the olefinic polymer may be effected, for example, through radical polymerization in a solvent (e.g., xylene, etc.) in the presence of a catalyst (e.g., peroxide, etc.). The melt flow rate (MFR) of the thus-prepared, carboxylic acid-modified polyolefin, when measured at 190° C., preferably falls between 0.2 and 30 g/10 min, more preferably between 0.5 and 10 g/10 min. The adhesive resins may be used either singly as single layer or combined as two or more layers.

For co-extruding the resin compositions of the invention along with a thermoplastic resin, for example, employable is any of a multi-manifold flow-combining T-die process, a feed block flow-combining T-die process, or an inflation process.

The thus-obtained, co-extruded multi-layered structures can be fabricated into various moldings (e.g., films, sheets, tubes, bottles, etc.), which include, for example, the following:

(1) Multi-layered, co-stretched sheets or films, which are produced by uniaxially or biaxially stretching multi-layered structures (e.g., sheets, films, etc.), or biaxially stretching them, and thereafter thermally fixing them.

(2) Multi-layered rolled sheets or films, which are produced by rolling multi-layered structures (e.g., sheets, films, etc.).

(3) Multi-layered tray or cup containers, which are produced through vacuum forming, pressure forming, vacuum-pressure forming or isothermal forming of multi-layered structures (e.g., sheets, films, etc.).

(4) Multi-layered bottle or cup containers, which are produced through stretch blow molding of multi-layered structures (e.g., pipes, etc.).

The method for fabricating the multi-layered structures of the invention is not limited to the above, and any other known fabricating methods (e.g., blow molding, etc.) could apply to the structures.

The multi-layered structures obtained in the manner as above smell little, and have few fish eyes. In addition, they are transparent and have few streaks. Therefore, they are favorable to materials for containers for drinks and edibles, for example, for deep-drawn containers, cup containers, bottles, etc.

EXAMPLES

The invention is described in more detail with reference to the following Examples, which, however, are not intended to restrict the scope of the invention. Unless otherwise specifically indicated, "%" and "parts" referred to herein are all by weight. Water used herein is all ion-exchanged water.

(1) Quantitative Determination of the Content of Carboxylic Acid (A):

20 g of a sample of dry chips is put into 100 ml of ion-exchanged water, and extracted under heat at 95° C. for 6 hours. The resulting extract is subjected to acid-base titration with 1/50 N NaOH to determine the content of the carboxylic acid (A) in the sample. Phenolphthalein is used as an indicator.

(2) Determination of the Ratio of the Content (μmol/g) of Carboxylic Acid (a1) Having a Molecular Weight of at Least 75 and its Salt to the Total Content (μmol/g) of Carboxylic Acid (A) and its Salt:

20 g of a sample of dry chips is put into 100 ml of ion-exchanged water, and extracted under heat at 95° C. for 6 hours. The content of the acids (a1) and (A) and their salts in the resulting extract is determined through ion chromatography, for which the column used is Yokokawa Electric's SCS5-252 and the eluent used is an aqueous solution of 0.1% phosphoric acid. From the data, the ratio of the content (μmol/g) of the carboxylic acid (a1) having a molecular weight of at least 75 and its salt to the total content (μmol/g) of the carboxylic acid (A) and its salt in the sample is obtained.

(3) Quantitative Determination of Alkali Metal Salt (B) and Alkaline Earth Metal Salt (C) (Quantitative Determination of Na, K, Mg and Ca Ions):

10 g of a sample of dry pellets is put into 50 ml of an aqueous solution of 0.01 N hydrochloric acid, and stirred at 95° C. for 6 hours. After having been thus stirred, the aqueous solution is subjected to quantitative analysis through ion chromatography, and the amount of Na ions, K ions, Mg ions and Ca ions therein is quantitatively determined. The column used is Yokokawa Electric's ICS-C25, and the eluent used is an aqueous solution containing 5.0 mM tartaric acid and 1.0 mM 2,6-pyridinedicarboxylic acid. For the quantitative determination, used are calibration curves of aqueous solutions of sodium chloride, potassium chloride, magnesium chloride and calcium chloride. From the data of Na ions, K ions, Mg ions and Ca ions thus obtained, the content of the alkali metal salt (B) and the alkaline earth metal salt (C) in the sample of dry pellets is derived in terms of the metal.

(4) Quantitative Determination of Phosphate Ions:

10 g of a sample of dry chips is put into 50 ml of an aqueous solution of 0.01 N hydrochloric acid, and stirred at 95° C. for 6 hours. After having been thus stirred, the aqueous solution is subjected to quantitative analysis through ion chromatography, and the amount of phosphate ions therein is quantitatively determined. The column used is Yokokawa Electric's ICS-A23, and the eluent used is an aqueous solution containing 2.5 mM sodium carbonate and 1.0 mM sodium hydrogencarbonate. For the quantitative determination, calibration curve of an aqueous solution of sodium dihydrogenphosphate is used. From the data, the content, in terms of the phosphate radical, of the phosphate compound (D) in the sample is obtained.

(5) Quantitative Determination of Boron Compound (E):

100 g of a sample of dry chips is put into a ceramic crucible, and ashed in an electric furnace. The resulting ash is dissolved in 200 ml of an aqueous solution of 0.01 N nitric acid, and subjected to atomic absorption analysis to thereby determine the content, in terms of the boron element, of the boron compound (E) in the sample.

(6) Relationship Between Heating Time and MFR:

5 g of a sample of dry pellets (from 3 to 4 g of the resin composition) is put into a stainless steel pipe (having an inner diameter of 2.2 cm, a length of 12.5 cm and a capacity of 50 cm³) in a nitrogen atmosphere, then the pipe is fully purged with nitrogen gas, and the sample therein is heated at 220° C. To obtain its MFR, the sample having been thus subjected to the heat treatment is heated in a melt indexer {Takara Kygyo's Melt Indexer L203 (having a sample cylinder diameter of 9.48 mmφ, a piston diameter of 9.48 mmφ, a die diameter of 2.09 amp, a die length of 8.01 mm)} at 230° C. for 6 minutes, and measured under a load of 10.9 kg.

(7) Discoloration Resistance:

8 g of a sample of dry pellets is sandwiched between hot plates (Shindo's desktop test press YS-5) heated at 230° C. with the hot plates being spaced from each other by 5 mm. In that condition, the sample is heated for 10 minutes. After having been thus heated, the sample was evaluated for macroscopic yellowing resistance according to the criteria mentioned below.

A: Colorless.
B: Slightly yellowed.
C: Visibly yellowed.
D: Strongly yellowed.

(8) Test for Forming Single-Layered Films:

A resin sample is formed into single-layered films according to the method mentioned below, and it is evaluated based on the appearance of the films formed and on the resin deposition around dies indicating the long-run workability of the resin sample.

Extruder used: single-screw extruder (with no bent), L/D: 20,
Aperture: 20 mmφ,
Screw: single-thread full-flight screw made of surface-nitrided steel,
Screw revolution: 40 rpm,
Die: coated hunger-type die having a width of 300 mm,
Lip-to-lip distance: 0.3 mm,
Cylinder and die temperature: C1/C2/C3/die=195/230/230/220 (° C.).

(8-a) Number of Fish Eyes Appearing in Films, and the Fluctuation of the Frequency of Fish Eyes Appearing Therein:

In 8-day continuous film-forming operation as above, the film being formed is sampled at intervals of 1 hour, and the number of the fish eyes (having a macroscopically detectable size of at least about 150 μm) seen on each film sampled is counted. From the number, per 1.0 m², of the thus-counted number of the fish eyes, obtained is the average number of the fish eyes having appeared in the film formed in one day. During the film-forming test, the films being formed are all the time macroscopically checked for streaks and fish eyes, and the frequency of abnormal increase in the streaks and gel-lie fish eyes (at least 100/m²) in one day is counted.

(8-b) Resin Deposition Around Die:

After 8-hour continuous film-forming operation as above, the EVOH resin in the extruder is substituted with LDPE (low-density polyethylene) having a MFR of 1, which takes one hour. The weight of the thermally-degraded EVOH resin having deposited around the die is measured. From the data, the sample tested was evaluated for deposition resistance according to the criteria mentioned below.

A: Smaller than 1.5 g.
B: From 1.5 to 5 g.
C: From 5 to 10 g.
D: Over 10 g.

(9) Interlayer Adhesiveness:

A fresh sample of a three-type five-layered film prepared according to the co-extrusion molding method mentioned below is tested through autography (rate of pulling: 250 mm/min) for the 90-degree peeling strength between the EVOH layer and the adhesive resin layer, at 20° C. and 65% RH. From the data of the peeling strength thus obtained, the sample was evaluated for interlayer adhesiveness according to the criteria mentioned below.

A: Over 500 g/15 mm.
B: From 300 to 500 g/15 mm.
C: Smaller than 300 g/15 mm.

Condition for Co-Extrusion Molding:

Layer constitution: LLDPE/adhesive resin/EVOH resin composition/adhesive resin/LLDPE (thickness, 50/10/10/10/50 μm),
LLDPE: Mitsui Chemical's Ultozex 3523L,
Adhesive resin: Sumitomo Chemical's Bondine TX8030, Resin extrusion temperature: C1/C2/C3/die=170/170/220/220° C.,
Resin extruders: all T-die extruders,
LLDPE: 32φ extruder, GT-32-A Model (from Plastic Engineering Laboratory),
Adhesive resin: 25φ extruder, P25-18AC (from Osaka Seiki),
EVOH: 20φ extruder, laboratory-type ME Model CO-EXT (from Toyo Seiki),
T-die: for 3-type 5-layered film, having a width of 300 mm (from Plastic Engineering Laboratory),
Chill roll temperature: 50° C.
Take-up rate: 4 m/min.

(10) Recyclability:

A sample of a single-layered EVOH film (sampled within 2 hours after the start of the molding operation in a continuous molding line) is milled, melted and again pelletized (at 220° C.) The pellets are molded into a film in the same manner as previously.

(10-a) Yellowing Resistance:

The film is wound up around a paper board tube, and the rolled film is macroscopically checked for the degree of yellowing at its edges. The yellowing resistance of the film is evaluated according to the criteria mentioned below.

A: Colorless.
B: Slightly yellowed.
C: Visibly yellowed.
D: Strongly yellowed.

(10-b) Fish Eyes:

One hour after the start of the molding operation, the film formed is sampled and checked for gel-like fish eyes (having a macroscopically detectable size of larger than about 100 μm). The number of the gel-like fish eyes seen on the film is counted. From the number, per 1.0 m², of the thus-counted number of the gel-like fish eyes, the fish eye resistance of the sample is evaluated according to the criteria mentioned below.

A: Smaller than 20.
B: From 20 to 40.
C: From 40 to 60.
D: Over 60.

(11) Odor:

20 g of a sample of EVOH chips is put into a 100-ml glass tube, and sealed with aluminium foil. The sample heated at 150° C. for 90 minutes in a hot air drier. After having been taken out of the drier, the sample is left to cool at room temperature for 1 hour. The sample tube is shaken two or three times. The aluminium foil is removed, and the sample in the tube is sniffed. The odor of the sample is evaluated according to the criteria mentioned below.

A: No smell.
B: Slight smell.
C: smell.
D: Strong Smell.

(12) Intrinsic Viscosity:

0.20 g of EVOH chips to be tested are sampled, and dissolved in 40 ml of aqueous phenol (water/phenol=15/85 wt. %) under heat at 60° C. over a period of 3 to 4 hours, and the viscosity of the resulting solution is measured with an Ostwald viscometer (t0=90 seconds). According to the following formula, the intrinsic (limiting) viscosity [η] of the sample is obtained.

$$[\eta] = (2 \times (\eta sp - \ln \eta rel))^{1/2}/C \text{ (l/g)},$$

ηsp=t/t0−1 (specific viscosity),

ηrel=t/t0 (relative viscosity),

C: concentration of EVOH (g/l), t0: time taken by the blank (aqueous phenol) to pass through the viscometer, t: time taken by the sample-containing aqueous phenol to pass through the viscometer.

Example 1-1

A 45% solution in methanol of ethylene-vinyl acetate copolymer having an ethylene content of 38 mol % was put into a reactor for saponification, to which was added a solution of sodium hydroxide in methanol (80 g/liter), the amount of sodium hydroxide added being 0.4 equivalents to the vinyl acetate moiety of the copolymer. Then, methanol was added thereto to produce a solution having a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into pellets each having a diameter of about 3 mm and a length of about 5 mm. The resulting pellets were dewatered in a centrifuge. A large amount of water was added thereto, and the pellets were again dewatered. This operation was repeated.

100 parts by weight of the wet pellets of ethylene-vinyl alcohol copolymer thus obtained (having an ethylene content of 38 mol %, a degree of saponification of 99.4%, and a water content of 55% by weight) were dipped in 370 parts by weight of an aqueous solution containing sodium lactate (0.8 g/liter), magnesium lactate (0.31 g/liter), potassium dihydrogenphosphate (0.17 g/liter), lactic acid (0.08 g/liter), and boric acid (0.32 g/liter), at 25° C. for 6 hours. After having been thus dipped, the pellets were dewatered, and dried at 80° C. for 3 hours and then at 107° C. for 24 hours in a hot air drier. Thus were obtained dry pellets. 100 parts by weight of the dry pellets were dryblended with 0.02 parts by weight of a lubricant, Alflow H-50T (ethylenebis-stearic acid amide, from Nippon Yushi). The product is EVOH resin composition pellets.

In the dry pellets, the content of the carboxylic acid (A) was 0.90 μmol/g, the total content of the carboxylic acid (A) and its salt was 10.3 μmol/g (in this, the content of the carboxylic acid (a1) having a molecular weight of at least 75 and its salt was 10.3 μmol/g), the content of the alkali metal salt (B) was 220 ppm in terms of the metal element, the content of the alkaline earth metal salt (C) was 35 ppm in terms of the metal element, the content of the phosphate compound (D) was 100 ppm in terms of the phosphate radical, and the content of the boron compound (E) was 240 ppm in terms of the boron element. The MFR (measured at 190° C. under a load of 2160 g) of the EVOH resin composition pellets was 2.0 g/10 min; and the intrinsic viscosity thereof was 0.085 l/g.

The EVOH resin composition pellets were tested according to the methods mentioned above for the relationship between the heating time and MFR (see FIG. 1) and for the yellowing resistance in melting them under heat. The MFR of the resin composition showed a minimum value within 10 hours after the start of heating it, and showed a maximum value (MFRmax) within 100 hours after showing its minimum value. The ratio of MFRmax/MFR0 of the resin composition was 1.8. In the heating test for the yellowing resistance of its melt, the resin composition was evaluated as grade A.

The EVOH resin composition pellets were formed into single-layered films according to the method mentioned above. The number of fish eyes seen on the films formed was counted; the frequency of the fish eyes seen on the films was analyzed as to whether and how it fluctuates; and the die used was checked for resin deposition around them. The frequency of the fish eyes was 6 or 7 per m$^2$ on average for the test period of 8 days, and was small. No abnormal increase in streaks and fish eyes was seen in the films formed, and the films all had good appearance. For its deposition around the die used, the resin composition was evaluated as grade A. The test results support good long-run workability of the resin composition.

The EVOH resin composition pellets were tested for interlayer adhesiveness according to the method mentioned above. In the test for 90°-peeling strength between the EVOH resin composition and the adhesive resin, the fresh samples tested were evaluated as grade A.

The single-layered film (sampled within 2 hours after the start of film formation) was tested for recyclability ((a) yellowing resistance and (b) fish eye resistance) according to the methods mentioned above. The film samples tested were all evaluated as grade A for both the yellowing resistance (a) and the fish eye resistance (b).

The EVOH resin composition pellets were tested for their odor according to the method mentioned above. In the test, the same was evaluated as grade A.

Examples 1-2 to 1-6, Comparative Examples 1-1 to 1-4

Dry pellets were prepared in the same manner as in Example 1-1. In this, however, EVOH having an intrinsic viscosity as in Table 2 was used. After having been saponified, washed and dewatered, pellets of EVOH having an ethylene content of 38 mol % and a degree of saponification of 99.4% were blended with or not blended with the lubricant, and then dipped in different processing solutions as in Table 1. The dry pellets were formed into films and tested. The test data are in Table 3.

TABLE 1

| | Composition of Processing Solution | | | | | | | | | |
|---|---|---|---|---|---|---|---|---|---|---|
| | Carboxylic Acid | | Alkali Metal Salt | | Alkaline Earth Metal Salt | | Phosphate Compound | | Boron Compound | |
| | Type | Amount (g/L) | Type | Amount (g/L) | Type | Amount (g/L) | Type | Amount (g/L) | Type | Amount (g/L) |
| Example 1-1 | lactic acid | 0.08 | sodium lactate | 0.8 | magnesium lactate | 0.31 | KH$_2$PO$_4$ | 0.17 | H$_3$BO$_3$ | 0.32 |

TABLE 1-continued

| | Composition of Processing Solution | | | | | | | | | |
|---|---|---|---|---|---|---|---|---|---|---|
| | Carboxylic Acid | | Alkali Metal Salt | | Alkaline Earth Metal Salt | | Phosphate Compound | | Boron Compound | |
| | Type | Amount (g/L) | Type | Amount (g/L) | Type | Amount (g/L) | Type | Amount (g/L) | Type | Amount (g/L) |
| Example 1-2 | lactic acid | 0.08 | sodium lactate | 0.8 | calcium lactate | 0.45 | $KH_2PO_4$ | 0.17 | $H_3BO_3$ | 0.32 |
| Example 1-3 | lactic acid | 0.08 | sodium lactate | 0.8 | magnesium lactate | 0.31 | $KH_2PO_4$ | 0.17 | — | |
| Example 1-4 | lactic acid | 0.08 | sodium lactate | 0.8 | magnesium lactate | 0.31 | — | | $H_3BO_3$ | 0.32 |
| Example 1-5 | lactic acid acetic acid | 0.05 0.06 | sodium lactate | 0.8 | magnesium lactate | 0.31 | $KH_2PO_4$ | 0.17 | $H_3BO_3$ | 0.32 |
| Example 1-6 | lactic acid | 0.08 | sodium lactale | 0.8 | magnesium lactate | 0.31 | $KH_2PO_4$ | 0.17 | $H_3BO_3$ | 0.32 |
| Comp. Ex. 1-1 | lactic acid | 0.4 | sodium lactate | 0.8 | magnesium lactate | 0.31 | $KH_2PO_4$ | 0.17 | $H_3BO_3$ | 0.32 |
| Comp. Ex. 1-2 | lactic acid | 0 | sodium lactate | 0.8 | magnesium lactate | 0.31 | $KH_2PO_4$ | 0.17 | $H_3BO_3$ | 0.32 |
| Comp. Ex. 1-3 | lactic acid | 0.08 | sodium lactate | 0.8 | magnesium lactate | 0 | $KH_2PO_4$ | 0.17 | $H_3BO_3$ | 0.32 |
| Comp. Ex. 1-4 | lactic acid | 0.44 | sodium lactate | 1.27 | magnesium lactate | 0.31 | $KH_2PO_4$ | 0.16 | $H_3BO_3$ | 0.05 |

TABLE 2

| | Composition of Dry Pellets | | | | | | | | | |
|---|---|---|---|---|---|---|---|---|---|---|
| | Carboxylic Acid μmol/g | Alkali Metal Salt (as metal) ppm | Alkaline Earth Metal Salt (as metal) ppm | Phosphate Compound (as phosphate radical) ppm | Boron Compound (as boron) ppm | Lubricant (*1) (wt. pts.) | Ratio of Carboxylic Acids (*2) | MFRmax/−MFR0 | Ratio of Additive Compounds (*3) | Intrinsic Viscosity (l/g) |
| Example 1-1 | 0.9 | 220 | 35 | 100 | 240 | 0.02 | 1 | 1.8 | 5.0 | 0.085 |
| Example 1-2 | 0.9 | 220 | 70 | 100 | 240 | 0.02 | 1 | 1.9 | 5.2 | 0.085 |
| Example 1-3 | 0.9 | 220 | 35 | 100 | 0 | 0.02 | 1 | 1.9 | 5.0 | 0.112 |
| Example 1-4 | 0.9 | 150 | 35 | 0 | 240 | 0.02 | 1 | 3.1 | 8.9 | 0.085 |
| Example 1-5 | 1.1 | 220 | 35 | 100 | 240 | 0.02 | 0.95 | 1.7 | 4.5 | 0.085 |
| Example 1-6 | 0.9 | 220 | 35 | 100 | 240 | 0 | 1 | 1.8 | 5.0 | 0.085 |
| Comp. Ex. 1-1 | 4.5 | 220 | 35 | 100 | 240 | 0.02 | 1 | 1.5 | 1.8 | 0.085 |
| Comp. Ex. 1-2 | 0 | 220 | 35 | 100 | 240 | 0.02 | 1 | 2 | 9.3 | 0.085 |
| Comp. Ex. 1-3 | 0.9 | 220 | 0 | 100 | 240 | 0.02 | 1 | — | 4.3 | 0.085 |
| Comp. Ex. 1-4 | 4.9 | 350 | 50 | 90 | 40 | 0 | 1 | 50 | 2.8 | 0.107 |

(*1): relative to 100 parts by weight of EVOH.
(*2): total content (μmol/g) of carboxylic acid (a1) having a molecular weight of at most 75 and its salt/total content (μmol/g) of carboxylic acid (A) and its salt.
(*3): Ratio of Additive Compounds = [alkali metal salt content (μmol/g) + alkaline earth metal salt content (μmol/g)]/[carboxylic acid content (μmol/g) + phosphate compound content (μmol/g)].

TABLE 3

| | | | | | | Test Results | | | | | | | | | | |
|---|---|---|---|---|---|---|---|---|---|---|---|---|---|---|---|---|
| | | | | | | Test for Molding Single-layered Films | | | | | | | | | | |
| | | | Recyclability | | | | Number of Fish Eyes (/m²) | | | | | Frequency of Abnormal Increase in Streaks and Fish Eyes (/day) | | | | |
| | | | (a) | (b) | | | | | | | | | | | | |
| | Adhesiveness | Discoloration Resistance | Odor | Yellowing Resistance | Fish Eyes | Resin Deposition around Die | Day 1 | Day 2 | Day 4 | Day 6 | Day 8 | Day 1 | Day 2 | Day 4 | Day 6 | Day 8 |
| Ex. 1-1 | A | A | A | A | A | A | 6 | 5 | 7 | 8 | 7 | 0 | 0 | 0 | 0 | 0 |
| Ex. 1-2 | A | A | A | A | A | A | 5 | 8 | 7 | 9 | 8 | 0 | 0 | 0 | 0 | 0 |
| Ex. 1-3 | A | A | A | A | B | A | 7 | 10 | 15 | 19 | 25 | 0 | 0 | 0 | 0 | 0 |
| Ex. 1-4 | A | A | A | B | A | A | 10 | 12 | 14 | 12 | 10 | 0 | 0 | 0 | 1 | 1 |
| Ex. 1-5 | A | A | B | A | A | A | 7 | 6 | 10 | 7 | 9 | 0 | 0 | 0 | 0 | 0 |
| Ex. 1-6 | A | A | A | B | B | B | 15 | 18 | 17 | 20 | 22 | 1 | 1 | 2 | 1 | 2 |
| Comp. Ex. 1-1 | C | B | B | B | B | B | 13 | 15 | 19 | 22 | 25 | 0 | 0 | 0 | 0 | 0 |

TABLE 3-continued

Test Results

| | | | Recyclability | | | Test for Molding Single-layered Films | | | | | | | | | |
|---|---|---|---|---|---|---|---|---|---|---|---|---|---|---|---|
| | | | (a) | (b) | Resin | Number of Fish Eyes (/m²) | | | | | Frequency of Abnormal Increase in Streaks and Fish Eyes (/day) | | | | |
| | Adhesive-ness | Discoloration Resistance | Odor | Yellowing Resistance | Fish Eyes | Deposition around Die | Day 1 | Day 2 | Day 4 | Day 6 | Day 8 | Day 1 | Day 2 | Day 4 | Day 6 | Day 8 |
| Comp. Ex. 1-2 | A | C | A | C | B | A | 9 | 15 | 13 | 16 | 18 | 0 | 0 | 0 | 0 | 0 |
| Comp. Ex. 1-3 | A | A | A | A | B | D | 10 | 9 | 20 | 27 | 31 | 3 | 4 | 4 | 5 | 7 |
| Comp. Ex. 1-4 | C | C | B | C | B | B | 17 | 16 | 16 | 20 | 24 | 1 | 1 | 1 | 2 | 2 |

Example 2-1

A 45% solution in methanol of ethylene-vinyl acetate copolymer having an ethylene content of 38 mol % was put into a reactor for saponification, to which was added a solution of sodium hydroxide in methanol (80 g/liter), the amount of sodium hydroxide added being 0.4 equivalents to the vinyl acetate moiety of the copolymer. Then, methanol was added thereto to produce a solution having a copolymer concentration of 20%. This was heated up to 60° C. and reacted for about 4 hours with nitrogen gas being introduced into the reactor. After 4 hours, this was neutralized with acetic acid to stop the reaction. This was extruded out into water through a die having a circular opening, solidified therein and cut into pellets each having a diameter of about 3 mm and a length of about 5 mm. The resulting pellets were dewatered in a centrifuge. A large amount of water was added thereto, and the pellets were again dewatered. This operation was repeated.

100 parts by weight of the wet EVOH pellets thus obtained (having an ethylene content of 38 mol %, a degree of saponification of 99.4%, and a water content of 55% by weight) were dipped in 370 parts by weight of an aqueous solution containing boric acid (0.32 g/liter), sodium acetate (0.4 g/liter), magnesium acetate (0.24 g/liter), potassium dihydrogenphosphate (0.17 g/liter), and acetic acid (0.5 g/liter), at 25° C. for 6 hours. After having been thus dipped, the pellets were dewatered, and dried at 80° C. for 3 hours and then at 107° C. for 24 hours in a hot air drier. Thus were obtained dry pellets. 100 parts by weight of the dry pellets were dryblended with 0.02 parts by weight of a lubricant, Alflow H-50T (ethylenebis-stearic acid amide, from Nippon Yushi). The product is EVOH resin composition pellets.

In the dry pellets, the content of the carboxylic acid (a2) having a molecular weight of smaller than 75 (acetic acid) was 250 ppm, the content of the alkali metal salt (B) was 220 ppm in terms of the metal element, the content of the alkaline earth metal salt (C) was 35 ppm in terms of the metal element, the content of the phosphate compound (D) was 100 ppm in terms of the phosphate radical, and the content of the boron compound (E) was 240 ppm in terms of the boron element. The MFR (measured at 190° C. under a load of 2160 g) of the EVOH resin composition pellets was 2.0 g/10 min.

The EVOH resin composition pellets were tested according to the methods mentioned above for the relationship between the heating time and MFR (see FIG. 2) and for the yellowing resistance in melting them under heat. The MFR of the resin composition showed a minimum value within 10 hours after the start of heating it, and showed a maximum value (MFRmax) within 100 hours after showing its minimum value. The ratio of MFRmax/MFR0 of the resin composition was 1.6. In the heating test for the yellowing resistance of its melt, the resin composition was evaluated as grade A.

The EVOH resin composition pellets were formed into single-layered films according to the method mentioned above. The number of fish eyes seen on the films formed was counted; the frequency of the fish eyes seen on the films was analyzed as to whether and how it fluctuates; and the die used was checked for resin deposition around them. The frequency of the fish eyes was 4 or 5 per m² on average for the test period of 8 days, and was small. No abnormal increase in streaks and fish eyes was seen in the films formed, and the films all had good appearance. For its deposition around the die used, the resin composition was evaluated as grade A. The test results support good long-run workability of the resin composition.

The EVOH resin composition pellets were tested for interlayer adhesiveness according to the method mentioned above. In the test for 90°-peeling strength between the EVOH resin composition and the adhesive resin, the fresh samples tested were evaluated as grade A.

The single-layered film (sampled within 2 hours after the start of film formation) was tested for recyclability ((a) yellowing resistance and (b) fish eye resistance) according to the methods mentioned above. The film samples tested were all evaluated as grade A for both the yellowing resistance (a) and the fish eye resistance (b).

Examples 2-2 to 2-6, Comparative Examples 2-1 to 2-8

Dry pellets were prepared in the same manner as in Example 2-1. In this, however, EVOH having an intrinsic viscosity as in Table 5 was used. After having been saponified, washed and dewatered, pellets of EVOH having an ethylene content of 38 mol % and a degree of saponification of 99.4% were blended with or not blended with the lubricant, and then dipped in different processing solutions as in Table 4. The dry pellets were formed into films and tested. The test data are in Table 6.

TABLE 4

Composition of Processing Solution

| | Boron Compound ($H_3BO_3$) (g/L) | Sodium Acetate (g/L) | Magnesium Acetate (g/L) | Calcium Acetate (g/L) | Phosphate Compound ($KH_2PO_4$) (g/L) | Acetic Acid (g/L) |
|---|---|---|---|---|---|---|
| Example 2-1 | 0.32 | 0.4 | 0.24 | 0 | 0.17 | 0.5 |
| Example 2-2 | 0.32 | 0.4 | 0 | 0.3 | 0.17 | 0.5 |
| Example 2-3 | 0.32 | 0.4 | 0.35 | 0 | 0.16 | 0.5 |
| Example 2-4 | 0.32 | 0.8 | 0.14 | 0 | 0.16 | 0.5 |
| Example 2-5 | 0.32 | 1.2 | 0.21 | 0 | 0.05 | 0.1 |
| Example 2-6 | 0.32 | 0.4 | 0.24 | 0 | 0.17 | 0.5 |
| Comp. Ex. 2-1 | 0 | 0.4 | 0.24 | 0 | 0.17 | 0.5 |
| Comp. Ex. 2-2 | 0.32 | 0.4 | 0.24 | 0 | 0 | 0.5 |
| Comp. Ex. 2-3 | 0.32 | 0.4 | 0 | 0 | 0.17 | 0.5 |
| Comp. Ex. 2-4 | 0.32 | 0.4 | 0.42 | 0 | 0.17 | 0.5 |
| Comp. Ex. 2-5 | 0.32 | 0.4 | 0.24 | 0 | 0.17 | 0 |
| Comp. Ex. 2-6 | 0.32 | 0 | 0.24 | 0 | 0.05 | 0.5 |
| Comp. Ex. 2-7 | 0.05 | 0.9 | 0.35 | 0 | 0.05 | 0.45 |
| Comp. Ex. 2-8 | 0.32 | 0.4 | 0.24 | 0 | 0.17 | 1.4 |

TABLE 5

Composition of Dry Pellets

| | Carboxylic Acid having a molecular weight of smaller than 75 (a2) (ppm) | Alkali Metal Salt (B) (ppm) (*1) | Alkaline Earth Metal Salt (C) (ppm) (*2) | Phosphate Compound (D) (ppm) (*3) | Boron Compound (E) (ppm) (*4) | Lubricant (*5) (wt. pts.) | MFRmax/-MFR0 | Ratio of Additive Compounds (*6) | Intrinsic Viscosity (l/g) |
|---|---|---|---|---|---|---|---|---|---|
| Example 2-1 | 250 | 220 | 35 | 100 | 240 | 0.02 | 1.6 | 2.1 | 0.085 |
| Example 2-2 | 250 | 220 | 70 | 100 | 240 | 0.02 | 1.7 | 2.2 | 0.085 |
| Example 2-3 | 250 | 215 | 50 | 90 | 240 | 0.02 | 26 | 2.2 | 0.085 |
| Example 2-4 | 250 | 365 | 20 | 90 | 240 | 0.02 | 0.8 | 3.3 | 0.085 |
| Example 2-5 | 80 | 470 | 30 | 30 | 240 | 0.02 | 14 | 13.1 | 0.085 |
| Example 2-6 | 250 | 220 | 35 | 100 | 240 | 0 | 1.6 | 2.1 | 0.085 |
| Comp. Ex. 2-1 | 250 | 220 | 35 | 100 | 0 | 0.02 | 1.7 | 2.1 | 0.112 |
| Comp. Ex. 2-2 | 250 | 150 | 35 | 0 | 240 | 0.02 | 3 | 1.9 | 0.085 |
| Comp. Ex. 2-3 | 250 | 220 | 0 | 100 | 240 | 0.02 | — | 1.8 | 0.085 |
| Comp. Ex. 2-4 | 250 | 220 | 60 | 100 | 240 | 0.02 | 50 | 2.3 | 0.085 |
| Comp. Ex. 2-5 | 20 | 220 | 35 | 100 | 240 | 0.02 | 3 | 7.9 | 0.085 |
| Comp. Ex. 2-6 | 250 | 22 | 35 | 30 | 240 | 0.02 | 1.5 | 0.5 | 0.085 |
| Comp. Ex. 2-7 | 210 | 350 | 50 | 30 | 40 | 0 | 55 | 4.5 | 0.107 |
| Comp. Ex. 2-8 | 700 | 220 | 35 | 100 | 240 | 0.02 | 1 | 0.9 | 0.085 |

(*1) in terms of the metal;
(*2) in terms of the metal;
(*3) in terms of the phosphate radical;
(*4) in terms of the boron element;
(*5) relative to 100 parts by weight of EVOH;
(*6) ratio of additive compounds = [alkali metal salt content (μmol/g) + alkaline earth metal salt content (μmol/g)]/[phosphate compound content (μmol/g) + content of carboxylic acid (a2) having a molecular weight of smaller than 75 (μmol/g)].

TABLE 6

Test Results

| | | | | | Test for Molding Single-layered Films | | | | | | | | | | |
|---|---|---|---|---|---|---|---|---|---|---|---|---|---|---|---|
| | | Recyclability | | | | Number of Fish Eyes (/m²) | | | | | Frequency of Abnormal Increase in Streaks and Fish Eyes (/day) | | | | |
| | | (a) | (b) | | Resin | | | | | | | | | | |
| | Adhesiveness | Discoloration Resistance t | Yellowing Resistance | Fish Eyes | Deposition around Die | Day 1 | Day 2 | Day 4 | Day 6 | Day 8 | Day 1 | Day 2 | Day 4 | Day 6 | Day 8 |
| Ex. 2-1 | A | A | A | A | A | 5 | 4 | 5 | 4 | 5 | 0 | 0 | 0 | 0 | 0 |
| Ex. 2-2 | A | A | A | A | A | 5 | 5 | 4 | 6 | 5 | 0 | 0 | 0 | 0 | 0 |
| Ex. 2-3 | A | A | B | A | A | 4 | 3 | 5 | 6 | 5 | 0 | 0 | 0 | 0 | 0 |
| Ex. 2-4 | A | A | B | A | B | 10 | 12 | 13 | 11 | 12 | 0 | 0 | 0 | 0 | 0 |
| Ex. 2-5 | A | B | B | B | A | 5 | 3 | 4 | 6 | 5 | 0 | 0 | 0 | 0 | 0 |
| Ex. 2-6 | A | A | B | A | B | 12 | 12 | 14 | 18 | 20 | 1 | 1 | 1 | 2 | 2 |
| Comp. Ex. 2-1 | A | A | A | B | A | 7 | 10 | 20 | 35 | 48 | 0 | 0 | 0 | 0 | 0 |
| Comp. Ex. 2-2 | A | A | A | C | B | A | 10 | 14 | 16 | 14 | 15 | 0 | 0 | 0 | 0 | 1 |

TABLE 6-continued

Test Results

| | | Recyclability | | | Test for Molding Single-layered Films | | | | | | | | | |
|---|---|---|---|---|---|---|---|---|---|---|---|---|---|---|
| | | (a) | (b) | Resin | Number of Fish Eyes (/m$^2$) | | | | | Frequency of Abnormal Increase in Streaks and Fish Eyes (/day) | | | | |
| | Adhesive-ness | Discoloration Resistance t | Yellowing Resistance | Fish Eyes | Deposition around Die | Day 1 | Day 2 | Day 4 | Day 6 | Day 8 | Day 1 | Day 2 | Day 4 | Day 6 | Day 8 |
| Comp. Ex. 2-3 | A | A | A | B | D | 11 | 8 | 24 | 27 | 32 | 3 | 3 | 4 | 6 | 7 |
| Comp. Ex. 2-4 | A | C | C | B | A | 5 | 8 | 10 | 8 | 12 | 0 | 0 | 0 | 0 | 0 |
| Comp. Ex. 2-5 | A | C | C | B | A | 5 | 10 | 12 | 17 | 15 | 0 | 0 | 0 | 1 | 1 |
| Comp. Ex. 2-6 | C | A | A | A | A | 5 | 6 | 5 | 4 | 7 | 0 | 0 | 0 | 0 | 0 |
| Comp. Ex. 2-7 | A | B | C | B | B | 12 | 14 | 15 | 20 | 22 | 1 | 1 | 2 | 1 | 2 |
| Comp. Ex. 2-8 | D | A | B | B | B | 25 | 30 | 47 | 55 | 72 | 0 | 0 | 0 | 1 | 1 |

The EVOH resin compositions of the invention obtained in Examples 1-1 to 1-6 and in Examples 2-1 to 2-6 all are yellowed little and give good moldings having good appearance with few fish eyes and streaks. They all ensure good long-run workability in melt-molding them, and good recyclability with good yellowing resistance. When formed into laminates, they ensure good interlayer adhesiveness. The resin composition of Example 1-6 not containing a lubricant is compared with that of Example 1-1 containing it. The former is somewhat inferior to the latter in point of the yellowing resistance and the fish eye resistance especially in recycling it, and of the resin deposition around molding dies. As compared with those of the latter, the moldings of the former had more fish eyes and the frequency of abnormal increase in fish eyes therein increased in some degree, but they are still on a practicable level.

As opposed to these, the adhesiveness of the EVOH resin composition of Comparative Examples 1-1 is poor, since the content of the carboxylic acid (A) therein is larger than 4 μmol/g; and the yellowing resistance of the EVOH resin composition of Comparative Example 1-2 is poor, since the content of the carboxylic acid (A) therein is smaller than 0.05 μmol/g. The moldings of the resin compositions of these Comparative Examples are not good, as having many fish eyes.

The resin composition of Comparative Example 1-3 does not satisfy the requirement of the invention with respect to the relationship between the heating time in a nitrogen atmosphere at 220° C. and MFR (at 230° C. under a load of 10.9 kg), precisely, the requirement thereof indicating that the MFR of the resin composition must show a minimum value within 10 hours after the start of heating it, and must show a maximum value (MFRmax) within 100 hours after showing its minimum value. When molded in melt, this deposited around the die to no small extent and the frequency of abnormal increase in fish eyes appeared on its moldings much increased. It is understood that the productivity of the moldings of the resin composition of Comparative Example 1-3 is poor.

The resin composition of Comparative Example 1-4 is similar to that of Example 1 in JP-A-67898/1998 discussed hereinabove. Its MFRmax/MFR0 is over 45, and its yellowing resistance and adhesiveness are poor. In addition, while processed in long-run molding operation, its moldings had many fish eyes.

The EVOH resin compositions of the invention obtained in Examples 2-1 to 2-6 all are yellowed little and give good moldings having good appearance with few fisheyes and streaks. They all ensure good long-run workability in melt-molding them, and good recyclability with good yellowing resistance. When formed into laminates, they ensure good interlayer adhesiveness. The resin composition of Example 2-6 not containing a lubricant is compared with that of Example 2-1 containing it. The former is somewhat inferior to the latter in point of the yellowing resistance and the fisheye resistance especially in recycling it, and of the resin deposition around molding dies. As compared with those of the latter, the moldings of the former had more fish eyes and the frequency of abnormal increase in fish eyes therein increased in some degree, but they are still on an practicable level.

As opposed to these, the moldings of the resin composition of Comparative Example 2-1 not containing a boron compound (E) had many fish eyes; and the yellowing resistance in recycling the moldings of the resin composition of Comparative Example 2-2 not containing a phosphate compound (D) is poor.

The resin composition of Comparative Example 2-3 does not satisfy the requirement of the invention with respect to the relationship between the heating time in a nitrogen atmosphere at 220° C. and MFR (at 230° C. under a load of 10.9 kg), precisely, the requirement thereof indicating that the MFR of the resin composition must show a minimum value within 10 hours after the start of heating it, and must show a maximum value (MFRmax) within 100 hours after showing its minimum value. When molded in melt, this deposited around the die to no small extent and the frequency of abnormal increase in fish eyes appeared on its moldings much increased. It is understood that the productivity of the moldings of the resin composition of Comparative Example 2-3 is poor.

The resin composition of Comparative Example 2-4 of which the ratio MFRmax/MFR0 is over 45, and that of Comparative Example 2-5 in which the content of the carboxylic acid (a2) having a molecular weight of smaller than 75 is lower than 50 ppm are both poor, as their yellowing resistance is not good. The resin composition of Comparative Example 2-6 in which the content of the alkali metal salt (B) is lower than 50 ppm is also poor, as its adhesiveness is low.

The resin composition of Comparative Example 2-7 is similar to that of Comparative Example 7 in JP-A-67898/1998 discussed hereinabove. Its MFRmax/MFR0 is over 45, and its yellowing resistance is poor. In addition, since the content of the boron compound (E) therein is lower than 50 ppm, its moldings produced in long-run molding operation had many fish eyes. The resin composition of Comparative Example 2-8 in which the content of the carboxylic acid (a2) having a molecular weight of smaller than 75 is over 500 ppm is also not good, since its adhesiveness is poor and its moldings had many fish eyes.

As described in detail hereinabove with reference to its embodiments, the invention provides an improved EVOH resin composition and a multi-layered structure comprising it. The resin composition has good interlayer adhesiveness when fabricated into laminates, and its moldings are yellowed little and have good appearances with few fish eyes (gels or hard spots) and streaks. While molded in melt, the resin composition ensures good long-run workability, and when recycled, it is yellowed little.

What we claim is:

1. A resin composition comprising an ethylene-vinyl alcohol copolymer, wherein when the resin composition is heat-treated in a nitrogen atmosphere at 220° C., melt flow rate (MFR) of the heat-treated resin composition, at 230° C. under a load of 10.9 kg, shows a minimum value within 10 hours after the start of heating it, and shows a maximum value, MFRmax, within 100 hours after showing its minimum value, that it satisfies the following formula (1):

$$1 \leq MFRmax/MFR0 \leq 20 \quad (1)$$

wherein
MFRmax indicates the maximum value of melt flow rate (at 230° C. under a load of 10.9 kg) of the resin composition heated in a nitrogen atmosphere at 220° C.;
MFR0 indicates melt flow rate (at 230° C. under a load of 10.9 kg) of the heat-untreated resin composition;
that it contains from 0.05 to 4 μmols/g of a carboxylic acid (A) (measured as the amount of the carboxylic acid (A) in the resin composition per the unit weight of the composition) and from 0.005 to 0.02 parts by weight, relative to 100 parts by weight of the ethylene-vinyl alcohol copolymer therein, of a lubricant, and
that it satisfies the following formula (2):

$$0.1 \leq (a1')/(A') \leq 1.0 \quad (2)$$

wherein
(A') indicates the total content (μmol/g) of the carboxylic acid (A) or a salt of the carboxylic acid (A) in the resin composition, the carboxylic acid (A) includes carboxylic acids consisting of carboxylic acids (a1) having a molecular weight of at least 75 and carboxylic acids (a2) having a molecular weight of smaller than 75;
(a1') indicates the content (μmol/g) of a carboxylic acid (a1) or a salt of the carboxylic acid (a1), wherein said carboxylic acid (a1) has a molecular weight of at least 75, said resin composition further comprising:
from 50 to 500 ppm, in terms of the alkali metal element, of an alkali metal salt (B) based on the weight of the resin composition,
from 10 to 120 ppm, in terms of the alkaline earth metal element, of an alkaline earth metal salt (C) based on the weight of the resin composition,
from 10 to 500 ppm, in terms of the phosphate radical, of a phosphate compound (D) based on the weight of the resin composition, and
from 50 to 2000 ppm, in terms of the boron element, of a boron compound (E) based on the weight of the resin composition, and
wherein the lubricant is a bis-amide of a fatty acid having at least 10 carbon atoms.

2. The resin composition as claimed in claim 1, which contains from 100 to 300 ppm, in terms of the alkali metal element, of an alkali metal salt (B) based on the weight of the resin composition.

3. The resin composition as claimed in claim 1, which contains from 20 to 100 ppm, in terms of the alkaline earth metal element, of an alkaline earth metal salt (C) based on the weight of the resin composition.

4. The resin composition as claimed in claim 1, which contains from 20 to 150 ppm, in terms of the phosphate radical, of a phosphate compound (D) based on the weight of the resin composition.

5. The resin composition as claimed in claim 1, which contains from 100 to 1500 ppm, in terms of the boron element, of a boron compound (E) based on the weight of the resin composition.

6. The resin composition as claimed in claim 1, wherein the carboxylic acid (a1) having a molecular weight of at least 75 is a hydroxycarboxylic acid.

7. The resin composition as claimed in claim 1, wherein the carboxylic acid (a1) having a molecular weight of at least 75 is a lactic acid.

8. The resin composition as claimed in claim 1, which satisfies the following formula (3):

$$2 \leq [B\ (\mu mol/g) + C\ (\mu mol/g)]/[A\ (\mu mol/g) + D\ (\mu mol/g)] \leq 9 \quad (3)$$

wherein A indicates the content (μmol/g) of the carboxylic acid (A) in the resin composition per the unit weight of the composition; B indicates the content (μmol/g, in terms of the alkali metal element) of the alkali metal salt (B) in the resin composition per the unit weight of the composition: C indicates the content (μmol/g, in terms of the alkaline earth metal element) of the alkaline earth metal salt (C) in the resin composition per the unit weight of the composition: D indicates the content (μmol/g, in terms of the phosphate radical) of the phosphate compound (D) in the resin composition per the unit weight of the composition.

9. A multi-layered structure comprising at least one layer of the resin composition of claim 1.

10. The resin composition as claimed in claim 1, wherein the bis-amide of a fatty acid having at least 10 carbon atoms is an ethylenebis-stearic acid amide.

* * * * *